US012039355B2

(12) United States Patent
Vanjare et al.

(10) Patent No.: US 12,039,355 B2
(45) Date of Patent: Jul. 16, 2024

(54) INTENT-BASED TELEMETRY COLLECTION SERVICE WITH SUPPORTED TELEMETRY PROTOCOL IN A VIRTUALIZED COMPUTING INFRASTRUCTURE

(71) Applicant: Juniper Networks, Inc., Sunnyvale, CA (US)

(72) Inventors: Gauresh Dilip Vanjare, Santa Clara, CA (US); Shruti Jadon, San Jose, CA (US); Tarun Banka, Milpitas, CA (US); Venny Kranthi Teja Kommarthi, San Jose, CA (US); Aditi Ghotikar, Sunnyvale, CA (US); Harshit Naresh Chitalia, Mountain View, CA (US); Keval Nimeshkumar Shah, San Jose, CA (US); Mithun Chakaravarrti Dharmaraj, Mountain View, CA (US); Rajenkumar Patel, Sunnyvale, CA (US); Yixiao Wei, Mountain View, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 215 days.

(21) Appl. No.: 16/947,930

(22) Filed: Aug. 24, 2020

(65) Prior Publication Data

US 2022/0058042 A1     Feb. 24, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01);
(Continued)

(58) Field of Classification Search
None
See application file for complete search history.

(56) References Cited

U.S. PATENT DOCUMENTS

| 6,856,257 B1 * | 2/2005 | Van Heteren | H04Q 9/00 |
| | | | 340/870.11 |
| 7,421,484 B2 * | 9/2008 | Das | H04L 41/0843 |
| | | | 709/227 |

(Continued)

FOREIGN PATENT DOCUMENTS

EP     3675423 A1     7/2020

OTHER PUBLICATIONS

Extended Search Report from counterpart European Application No. 20207476.1, dated May 7, 2021, 9 pp.
(Continued)

*Primary Examiner* — Meng Ai T An
*Assistant Examiner* — Zujia Xu
(74) *Attorney, Agent, or Firm* — SHUMAKER & SIEFFERT P. A.

(57) ABSTRACT

A telemetry service can receive telemetry collection requirements that are expressed as an "intent" that defines how telemetry is to be collected. A telemetry intent compiler can receive the telemetry intent and translate the high level intent into abstract telemetry configuration parameters that provide a generic description of desired telemetry data. The telemetry service can determine, from the telemetry intent, a set of devices from which to collect telemetry data. For each device, the telemetry service can determine capabilities of the device with respect to telemetry data collection. The capabilities may include a telemetry protocol supported by the device. The telemetry service can create a protocol specific device configuration based on the abstract telemetry configuration parameters and the telemetry protocol supported by the device. Devices in a network system that
(Continued)

support a particular telemetry protocol can be allocated to instances of a telemetry collector that supports the telemetry protocol.

20 Claims, 17 Drawing Sheets

(52) U.S. Cl.
CPC .............. *G06F 2009/45591* (2013.01); *G06F 2009/45595* (2013.01); *G06F 2209/503* (2013.01); *G06F 2209/505* (2013.01)

(56) References Cited

U.S. PATENT DOCUMENTS

| | | | |
|---|---|---|---|
| 11,018,959 B1* | 5/2021 | Neill | H04L 43/026 |
| 2008/0122228 A1* | 5/2008 | Liu | G01F 13/00 290/40 C |
| 2009/0274144 A1* | 11/2009 | Garg | H04L 65/1104 370/352 |
| 2014/0032965 A1* | 1/2014 | Tsukamoto | G06F 11/0706 714/30 |
| 2018/0006900 A1* | 1/2018 | Korycki | H04L 41/147 |
| 2018/0074855 A1* | 3/2018 | Kambatla | G06F 9/505 |
| 2018/0176663 A1* | 6/2018 | Damaggio | H04L 41/0816 |
| 2020/0192689 A1* | 6/2020 | Smith, IV | G06F 16/178 |
| 2020/0249979 A1 | 8/2020 | Muramatti et al. | |
| 2020/0366575 A1* | 11/2020 | Rajendran | H04L 41/044 |
| 2020/0404731 A1* | 12/2020 | Speicher | H04W 76/11 |
| 2021/0250220 A1* | 8/2021 | Yang | H04L 41/052 |
| 2021/0294724 A1* | 9/2021 | Muppalla | G06F 16/243 |
| 2022/0013015 A1* | 1/2022 | J | B64C 39/024 |

OTHER PUBLICATIONS

Riftadi et al., "P4I/O: Intent-Based Networking with P4," IEEE NetSoft 2019, 2nd International Workshop on Emerging Trents in Softwarized Networks(ETSN), Jun. 2019, 6 pp.

Kompella et al., "Detection and Localization of Network Black Holes," IEEE INFOCOM 2007—26th IEEE International Conference on Computer Communications, May 6-12, 2007, 9 pp.

Response to Extended Search Report dated Mar. 2, 2022, from counterpart European Application No. 20207476.1 filed Sep. 1, 2022, 29 pp.

Communication pursuant to Article 94(3) EPC from counterpart European Application No. 20207476.1 dated Nov. 28, 2023, 4 pp.

* cited by examiner

| Message Type | Caller | Destination | Format | Response | Description |
|---|---|---|---|---|---|
| RegisterTelemetryDevice | App | Telemetry Controller | {<br>Network_device_id: <device uuid>,<br>Application_id: <app uuid><br>Telemetry:<br>  {<br>  'op':<br>    {<br>    'sensors':['/junos/system/linecard/fabric/',<br>    'sensors':['/junos/system/linecard/interface/'<br>    }<br>  'grpc':<br>    {<br>    'sensors':['/junos/hpu-memory']<br>    }<br>  'syslog':<br>    {'sensors': 'syslog'}<br>  'snmp_trap':<br>    {'sensors': 'snmp_trap'}<br>  'netconf':<br>    {'commands': '<get-log>'}<br>  }<br>} | Job Id<br>Or<br>Error code with error message | New Application Telemetry request for a specific device<br>OR<br>Modify existing telemetry request for an application |
| UnregisterTelemetryDevice | App | Telemetry Controller | {<br>Network_device_id: <device uuid><br>Application_id: <App uuid><br>}<br>OR<br>{<br>Network_device_id: <device uuid><br>Application_id: <App uuid><br>protocols: [<br>'protocols': 'snmp'<br>]<br>} | Job Id<br>or<br>Error code with Error message | Remove existing telemetry request for a given application<br>OR<br>Unregister from only specific protocols (out of multiple registered protocols) for a device |
| GetAllTelemetryDevices | App | Telemetry Controller | {<br>Application_id: <App uuid><br>} | List of Telemetry Requests<br>Or<br>Error Code with Error message | Get All telemetry requirements for different devices for a given application |
| GetTelemetryDeviceById | App | Telemetry Controller | {<br>Network_device_id: <device uuid><br>Application_id: <App uuid><br>} | Telemetry Request<br>Or<br>Error Code with Error message | Get Telemetry request for a specific device for a given application |

FIG. 12

| Message Type | Caller | Destination | Format | Response | Description |
|---|---|---|---|---|---|
| telemetrySubscribe | App | Telemetry Subscription Service | { App_id, Network_device_id <list>, Protocol_type, Sensor_resource_path : <list> } | {Subscriptioid, Data, Response_code, response_msg, } Or Error Code with message | Add specific subscription for telemetry data |
| cancelTelemetrySubscription | App | Telemetry Subscription Service | { App_id, subscription_id } | { Response_code, response_msg} Or Error Code with message | Delete specific subscription for telemetry data |
| getAllTelemetrySubscriptions | App | Telemetry Subscription service | {app_id} | { Subscription_id: <list> response_code, response_msg} | Get all subscriptions for a given application. |

FIG. 13

| Microservice | Health Metrics List Per Instance | Rules Scale Out / Scale Down |
|---|---|---|
| Controller API server | CpuUsage<br>MemoryUsage<br>NetworkDevicesTotalCount<br>ApplicationsTotalCount<br>NetworkDeviceAddRate<br>NetworkDeviceUpdateRate<br>NetworkDeviceDeleteRate | For each of the health metric following rules are defined<br><br>If \<Metric\> is above \<threshold\> for N monitoring windows of duration \<D\> seconds then Scale Out<br><br>If \<Metric\> is below \<threshold\> for N monitoring windows of duration \<D\> seconds then scale down |
| Controller Config Manager | CpuUsage<br>MemoryUsage<br>NetworkDeviceAddRate<br>NetworkDeviceUpdateRate<br>ConfigManagerQueueSize | Same as above |
| Controller Inventory Service Manager | CpuUsage<br>MemoryUsage<br>NetworkDeviceAddRate<br>NetworkDeviceUpdateRate<br>InventoryManagerQueueSize | Same as above |
| Subscription Service | CpuUsage<br>MemoryUsage<br>ActiveSubscriberCount<br>ActiveGrpcChannelCount<br>TotalSubscriptionKeyCount<br>RedisChannelCount | Same as above |
| SNMP Collector | CpuUsage<br>MemoryUsage<br>SnmpDataQueueSize<br>SnmpMessageIngressRate<br>SnmpMessageEgressRate | Same as above |

FIG. 14A

| gRPC Collector | CpuUsage<br>MemoryUsage<br>grpcDataQueueSize<br>grpcMessageIngressRate<br>grpcMessageEgressRate | Same as above |
|---|---|---|
| Netconf Collector | CpuUsage<br>MemoryUsage<br>netconfDataQueueSize<br>netconfMessageIngressRate<br>netconfMessageEgressRate | Same as above |
| Syslog Collector | CpuUsage<br>MemoryUsage<br>syslogDataQueueSize<br>syslogMessageIngressRate<br>sysogMessageEgressRate | Same as above |
| Flow Collector | CpuUsage<br>MemoryUsage<br>flowDataQueueSize<br>flowMessageIngressRate<br>flowMessageEgressRate | Same as above |
| SNMP Trap Collector | CpuUsage<br>MemoryUsage<br>SnmpTrapQueueSize<br>SnmpTrapMessageIngressRate<br>SnmpTrapMessageEgressRate | Same as above |
| Pub/Sub Service | MessagePublishRate<br>MessageSubscribeRate<br>TotalSubscriptionCount | Same as above |

FIG. 14B

| Microservice | Health Metrics per microservice instance |
|---|---|
| Alarm Rule Intent Compiler | CpuUsage<br>MemoryUsage<br>AlarmIntentCount<br>AlarmRuleIntentAddRate<br>AlarmRuleIntentDeleteRate |
| Alarm Intent Programming | CpuUsage<br>MemoryUsage<br>AlarmRuleInstanceCount<br>AlarmRulePeningRules<br>AlarmRuleProgammingLatency |
| Alarm Execution Engine | CpuUsage<br>MemoryUsage<br>AlarmRuleInstanceCount<br>AlarmRuleExecutionLatency<br>AlarmRuleDataQueueSize<br>AlarmRuleConfigQueueSize<br>AlarmRuleNotificiationRate<br>AlarmRuleStaleCount |
| Alarm Data Adapter | CpuUsage<br>MemoryUsage<br>AlarmNotificationIngressRate<br>AlarmNotificationEgressRate<br>AlarmNotificationQueueSize |
| Alarm Subscription Service | CpuUsage<br>MemoryUsage<br>ActiveSubscriberCount<br>ActiveGrpcChannelCount<br>TotalSubscriptionKeyCount<br>RedisChannelCount |

FIG. 15

INTENT-BASED TELEMETRY COLLECTION SERVICE WITH SUPPORTED TELEMETRY PROTOCOL IN A VIRTUALIZED COMPUTING INFRASTRUCTURE

TECHNICAL FIELD

This disclosure relates to computer networks and, more specifically, to collecting telemetry data in computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides.

Supporting virtualized computing infrastructure in a large scale data center involves numerous devices, including network devices and host computing devices, that can be coupled together in a data center network. Additionally, devices in a data center may be allocated to different tenants. Telemetry data from devices in a data center can be useful in determining that a data center is operating properly and efficiently. Configuring devices to provide telemetry data can be difficult given the large number of devices, different types of devices, and different tenants that may be present in a data center.

SUMMARY

This disclosure describes techniques for providing a scalable, microservice based telemetry service that can collect time-series telemetry data from network and computing devices and make it available to different consumers of the data through a subscription service. Consumers of the telemetry data can be other shared services such as an alarm service, persistent storage service or end user application.

An administrator or application can express telemetry collection requirements as an "intent" that defines how telemetry is to be collected in a high level "natural language." A telemetry intent compiler can receive the telemetry intent and translate the high level intent into abstract telemetry configuration parameters that provide a generic description of desired telemetry data. The telemetry service can determine, from the telemetry intent, a set of devices from which to collect telemetry data. For each device, the telemetry service can determine capabilities of the device with respect to telemetry data collection. The capabilities may include a telemetry protocol supported by the device. The telemetry service can create a protocol specific device configuration based on the abstract telemetry configuration parameters and the telemetry protocol supported by the device. Devices in a network system that support a particular telemetry protocol can be allocated to instances of a telemetry collector that supports the telemetry protocol in a distributed manner.

The telemetry service can be implemented as a collection of microservices. New instances of a microservice may be created in response to growing demand for telemetry collection services.

The techniques described herein may provide one or more technical advantages. For example, the techniques may facilitate the use of telemetry service components that may be implemented as microservices, and that may be fault tolerant and scalable. As a result, the telemetry service can be easily scaled to meet variations in the number of devices in use by a network system. In addition to scalability, the alarm service is easy to use by network administrators and application designers, because an application can provide an intent expressed in a high level natural language, and the telemetry service can translate the intent into a telemetry configuration that can be pushed to devices determined based on the telemetry intent.

In one example, a method for providing a telemetry service in a virtualized computing infrastructure includes receiving, by one or more processors, data representing telemetry data collection intent; translating, by the one or more processors, the data representing the telemetry data collection intent into one or more abstract telemetry configuration parameters; determining, by the one or more processors and from the data representing the telemetry collection intent, a set of devices of the virtualized computing infrastructure; obtaining, by the one or more processors, device capability information for the set of devices, the device capability information including, for each device of the set of devices, a supported telemetry protocol; and for each device of the set of devices, configuring the device based on the abstract telemetry configuration parameters and allocating the device to an instance of a plurality of telemetry collectors based on the supported telemetry protocol of the device.

In another example, a telemetry service system includes a device management service configured to discover a plurality of devices in a virtualized computing infrastructure and to determine device capability information for each of the plurality of devices; a telemetry controller configured to: receive data representing telemetry data collection intent, translate the data representing the telemetry data collection intent into one or more abstract telemetry configuration parameters, determine from the data representing the telemetry collection intent, a set of devices of a plurality of devices; obtain, from the device management service, the device capability information for each of the set of devices, the device capability information including, for each device of the set of devices, a supported telemetry protocol, and for each device of the set of devices, configure the device based on the abstract telemetry configuration parameters and allocate the device to an instance of a plurality of telemetry collectors based on the supported telemetry protocol of the device.

In a further example, a computer-readable medium includes instructions that, when executed, cause processing circuitry of a virtualized computing infrastructure to: receive data representing telemetry data collection intent; translate the data representing the telemetry data collection intent into one or more abstract telemetry configuration parameters; determine, from the data representing the telemetry collection intent, a set of devices of the virtualized computing infrastructure; obtain device capability information for the set of devices, the device capability information including, for each device of the set of devices, a supported telemetry protocol; and for each device of the set of devices, configure the device based on the abstract telemetry configuration parameters and allocate the device to an instance of a plurality of telemetry collectors based on the supported telemetry protocol of the device.

The details of one or more techniques of the disclosure are set forth in the accompanying drawings and the description below. Other features, objects, and advantages of the invention will be apparent from the description and drawings, and from the claims.

BRIEF DESCRIPTION OF THE DRAWINGS

FIG. 12 illustrates an API for exchanging messages between an application and a telemetry controller in accordance with one or more aspects of the present disclosure.

FIG. 13 illustrates an API for exchanging telemetry subscription messages in accordance with one or more aspects of the disclosure.

FIGS. 14A and 14B illustrate health metrics and rules for a scaling a telemetry collection service in accordance with one or more aspects of the disclosure.

FIG. 15 illustrates health metrics for an alarm service according to one or more aspects of the present disclosure.

DETAILED DESCRIPTION

Data centers that use virtualized computing environments in which virtual hosts, virtual machines, or containers are deployed and executed on an underlying compute platform of physical computing devices provide efficiency, cost, and organizational advantages. A typical data center employs numerous devices, including network devices and host devices, that are used to support the virtualized environment and enable communication between entities both within the data center and external to the data center. Telemetry data collected for the numerous devices in a data center may be useful in efficiently managing a data center fabric. For example, telemetry data from networking devices may be used by alarm services or applications to facilitate detection of anomalies and to determine network hot spots.

In some cases, configuring devices to provide telemetry data can be a challenge, particularly given the number of devices and host devices in a network and the variety of different devices in the network and the number of different telemetry collection protocols that may be supported by the devices. It can be difficult for a network administrator to master all of the different commands or application program interfaces (APIs) that may be necessary to configure a device to collect and provide telemetry data. Further, it can be difficult to determine where a problem or issue with telemetry data collection lies within a telemetry service given the number of instances of telemetry service components that may be present in the telemetry service.

Techniques are described herein to enable a network administrator or application to indicate the administrator's or application's intent with respect to obtaining telemetry data for devices in a network. The administrator's intent can be translated into one or more lower level configuration parameters and commands that conform to different protocols and metrics that can be obtained from devices. Further, the techniques described herein can facilitate a telemetry service that can be readily scaled to meet telemetry data collection demands. As the network grows and/or as more requests for telemetry data are made, the telemetry service can add instances of components to meet the demand.

Figure 1:
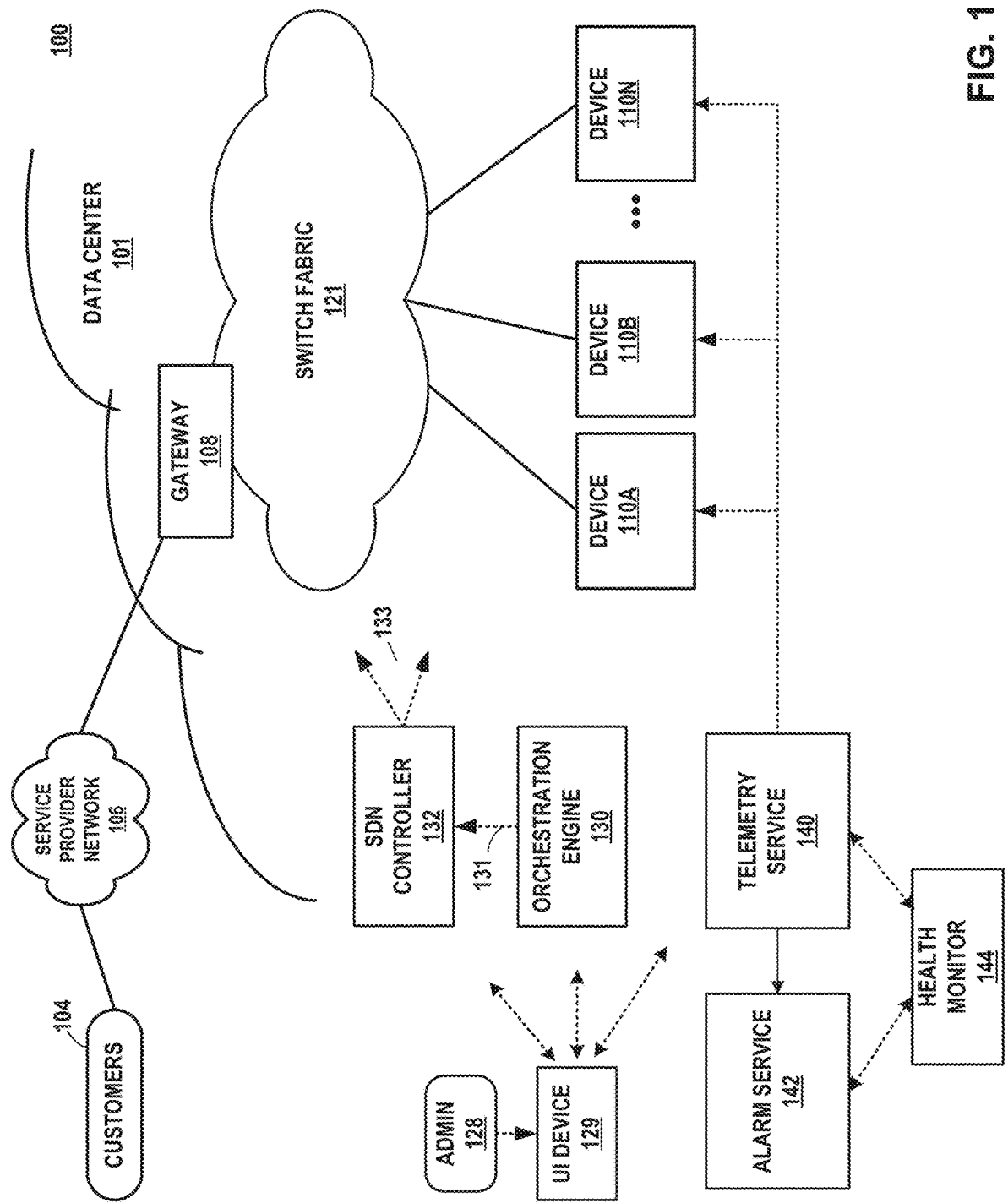
FIG. 1 is a conceptual diagram illustrating an example network that includes an intent based telemetry collection service, in accordance with one or more aspects of the present disclosure.

FIG. 1 is a conceptual diagram illustrating an example network that includes an intent based telemetry service 140 in a network, for example, a network within a data center, in accordance with one or more aspects of the present disclosure. FIG. 1 illustrates one example implementation of a network system 100 and a data center 101 that hosts one or more computing networks, computing domains or projects, and/or cloud-based computing networks. Network system 100 may include a virtualized computing infrastructure, such as one or more cloud-based computing clusters that may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments, collections of bare metal servers, Contrail or Tungsten clusters, or other computing clusters, domains, networks and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on.

In the example of FIG. 1, data center 101 includes a set of storage systems, application servers, compute nodes, or other devices, including device 110A through device 110N (collectively "devices 110," representing any number of devices). Devices 110 may be interconnected via high-speed switch fabric 121 provided by one or more tiers of physical network switches and routers. In some examples, devices 110 may be included within fabric 121, but are shown separately for ease of illustration.

Devices 110 may represent any of a number of different types of devices (core switches, spine network devices, leaf network devices, edge network devices, or other network devices), but in some examples, one or more devices 110 may represent physical compute nodes and/or storage nodes of the data center. For example, one or more of devices 110 may provide an operating environment for execution of one or more customer-specific applications or services. Alternatively, or in addition, one or more of devices 110 may provide an operating environment for one or more virtual machines or other virtualized instances, such as containers. In some examples, one or more of devices 110 may be alternatively referred to as a host computing device or, more simply, as a host. A device 110 may thereby execute one or more virtualized instances, such as virtual machines, containers, or other virtual execution environment for running one or more applications or services, such as virtualized network functions (VNFs).

In general, each of devices 110 may be any type of device that may operate on a network and which may generate data (e.g. connectivity data, flow data, sFlow data, resource utilization data) accessible through telemetry or otherwise, which may include any type of computing device, sensor, camera, node, surveillance device, or other device. Further, some or all of devices 110 may represent a component of another device, where such a component may generate data collectible through telemetry or otherwise. For example, some or all of devices 110 may represent physical or virtual devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other devices. Switch fabric 121 may perform layer 3 routing to route network traffic between data center 101 and customers 104 by service provider network 106. Gateway 108 acts to send and receive packets between switch fabric 121 and service provider network 106.

In some examples, orchestration engine 130 manages functions of data center 101 such as compute, storage, networking, and application resources. Orchestration engine 130 may implement a security policy across a group of VMs or to the boundary of a tenant's network. Orchestration engine 130 may deploy a network service (e.g. a load balancer) a tenant's virtual network.

Software-Defined Networking ("SDN") controller 132 provides a logically and in some cases physically centralized controller for facilitating operation of one or more virtual networks within data center 101 in accordance with one or more examples of this disclosure. In some examples, SDN controller 132 operates in response to configuration input received from orchestration engine 130 via northbound application programming interface (API) 131, which in turn may operate in response to configuration input received from an administrator 128 interacting with and/or operating user interface device 129. SDN controller 132 may create a virtual network for a tenant within data center 101 or across data centers. SDN controller 132 may attach virtual machines (VMs) to a tenant's virtual network. SDN controller 132 may connect a tenant's virtual network to an external network, e.g. the Internet or a VPN.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g. top-of-rack (TOR) switches, chassis switches, and switch fabric 121; physical routers; physical service nodes such as firewalls and load balancers; and virtual services such as virtual firewalls in a VM. SDN controller 132 maintains routing, networking, and configuration information within a state database. Different cloud computing clusters may have separate instances of SDN controller 132.

Telemetry service 140 can configure devices 110 (and/or other devices) to generate and provide telemetry data related to the operations of devices 110. Such data can include process usage data, memory usage data, network usage data, error counts etc. Telemetry service 140 can be configured to collect the telemetry data from devices 110 using protocols supported by the devices 110 Applications, processes, threads etc. can subscribe to the collected telemetry data in order to be notified telemetry data is available for a device or devices on a network.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer; or any other computing device that may be operated by a user and/or present a user interface in accordance with one or more aspects of the present disclosure. In some examples, user interface device 129 may be physically separate from and/or in a different location than controller 132. In such examples, user interface device 129 may communicate with controller 132 over a network or other means of communication. In other examples, user interface device 129 may be a local peripheral of controller 132, or may be integrated into controller 132.

In some aspects, user interface device 129 may communicate with telemetry service 140 or a component thereof to configure the telemetry service 140 to configure devices to provide telemetry data using high-level statements of intent and to receive telemetry data from devices 110 and other components of data center 101 via telemetry service 140. In some aspects, telemetry service 140 may be configured by applications or services that use telemetry data obtained via telemetry service 140. For example, an alarm service (not shown) or components of an alarm service may configure telemetry service 140 to collect and provide telemetry data from devices 110.

Alarm service 142 may be a consumer of telemetry data collected by telemetry service 140. Alarm service 142 may implement services and rules that can be used to subscribe to telemetry data and analyze the telemetry data according to rules that determine if an alarm should be generated based on the telemetry data. Further details on an example alarm service may be found in co-filed, co-pending U.S. patent application Ser. No. 16/947,927, entitled "INTENT-BASED DISTRIBUTED ALARM SERVICE", which is hereby incorporated by reference.

Health monitor 144 is an optional component that can utilize metrics associated with services and components of system 100 and determine the health of components. In the example illustrated in FIG. 1, health monitor 144 can obtain metrics regarding the operation of telemetry service 140 and/or alarm service 142 and use the metrics to determine if new instances of a service should be created in response to system growth or failures of components in telemetry, service 140 and/or alarm service 142.

In accordance with techniques of this disclosure, telemetry service 140 provides a sharable telemetry data collection service to collect telemetry data from devices in a network system according to a protocol supported by the device. The collected telemetry data can be used to perform anomaly detection and alarm generation for cloud infrastructure monitoring that can be used by multiple applications and tenants at a cloud scale.

An administrator 128 can utilize UI device 129 to input data expressing a telemetry collection requirement as an "intent" defined in a high level "natural language." Telemetry service 140 can receive the data representing the intent and translate the high level intent into abstract telemetry configuration parameters that can be programmatically processed by a telemetry controller of telemetry service 140. The telemetry controller can create a protocol specific telemetry configuration for a device based on the abstract telemetry configuration parameters and the telemetry protocols supported by the device.

Figure 2:
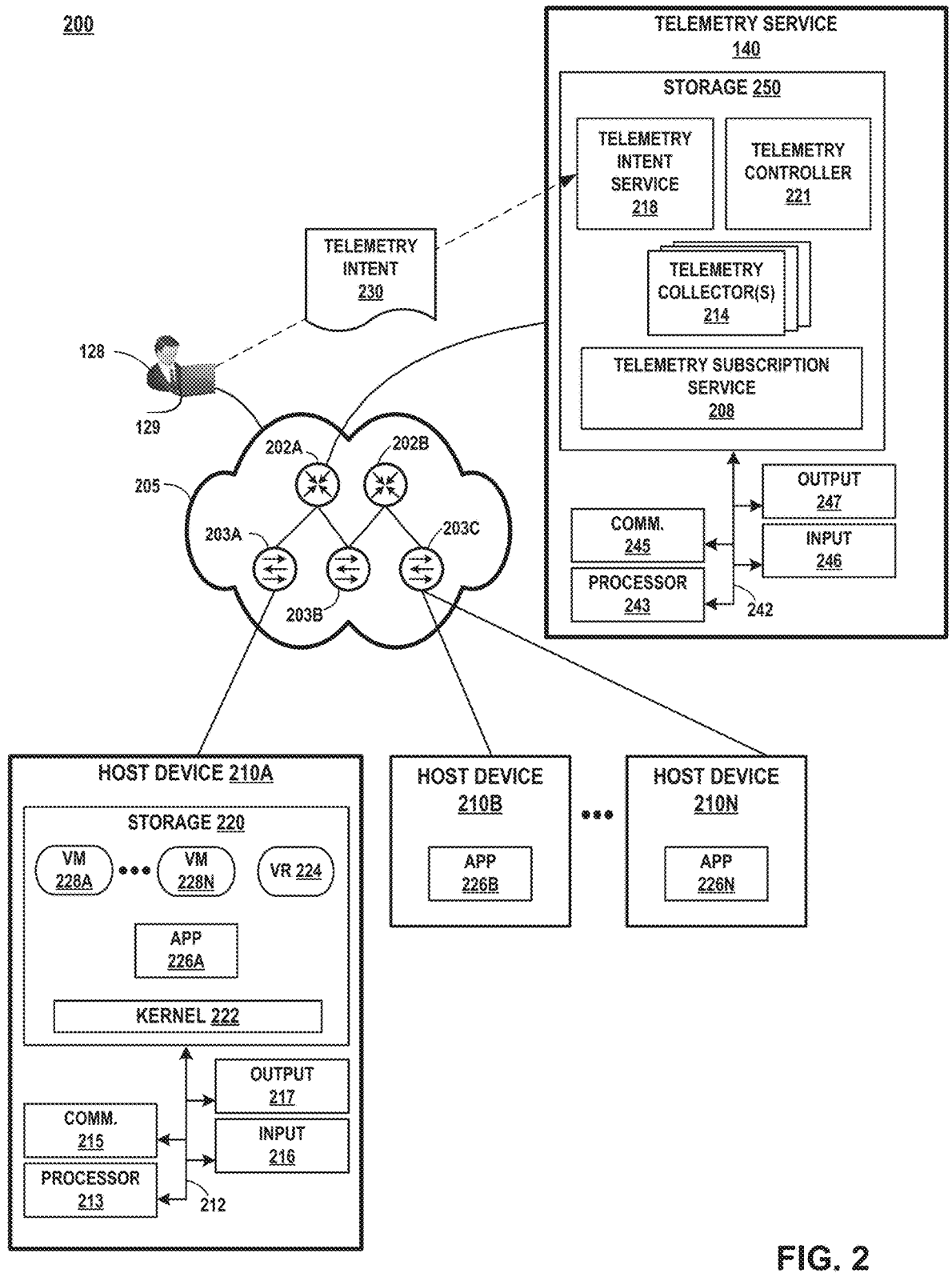
FIG. 2 is a block diagram illustrating an example system including a telemetry collection service in a network and/or within a data center, in accordance with one or more aspects of the present disclosure.

FIG. 2 is a block diagram illustrating an example system including a telemetry service in a network and/or within a data center, in accordance with one or more aspects of the present disclosure. Network system 200 of FIG. 2 may be described as an example or alternative implementation of network system 100 of FIG. 1. One or more aspects of FIG. 2 may be described herein within the context of FIG. 1.

Although a data center, such as that illustrated in FIG. 1 and FIG. 2 may be operated by any entity, some data centers are operated by a service provider, where the business model of such a service provider may involve providing computing capacity to customers or clients. For this reason, data centers usually contain a huge number of compute nodes, or host devices. In order to operate efficiently, those hosts have to be connected to each other and to the external world, and that ability is provided through physical devices, which may be interconnected in a leaf-spine topology. The collection of these physical devices, such as network devices and host devices, form the underlay network.

Each host device in such a data center may have several virtual machines running on it, which may be referred to as workloads. Clients of the data center usually have access to these workloads, and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience network issues such as increased latency, packet loss, low network throughput, or slow workload processing. Troubleshooting such issues may be complicated by the deployment of workloads in a large multitenant data center. Telemetry data such as that provided by telemetry service 140 may be used to facilitate troubleshooting in a data center.

In the example of FIG. 2, network 205 connects telemetry service 140, host device 210A, and host devices 210B—210N. Telemetry service 140 may correspond to an example or alternative implementation of telemetry service 140 illustrated in FIG. 1. Host devices 210A, 210B, through 210N may be collectively referenced as "host devices 210," representing any number of host devices 210.

Each of host devices 210 may be an example of devices 110 of FIG. 1, but in the example of FIG. 2, each of host devices 210 is implemented as a server or host device that operates as a physical or virtualized compute node or a storage node of a virtualized data center, as opposed to a network device. As further described herein, one or more of host devices 210 (e.g., host device 210A of FIG. 2) may execute multiple virtual computing instances, such as virtual machines 228, and in addition, one or more of host devices 210 (e.g., one or more of host devices 210B through 210N) may execute applications or service modules on a non-virtualized, single-tenant, and/or bare metal server. Accordingly, as in FIG. 1, the example of FIG. 2 illustrates a network system that may include a mix of virtualized server devices and bare metal server devices.

Also connected to network 205 is user interface device 129, which may be operated by administrator 128, as in FIG. 1. In some examples, user interface device 129 may present, at a display device associated with user interface device 129, one or more user interfaces.

Network 205 may correspond to any of switch fabric 121 and/or service provider network 106 of FIG. 1, or alternatively, may correspond to a combination of switch fabric 121, service provider network 106, and/or another network. Although not shown in FIG. 2, network 205 may also include some of the components of FIG. 1, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of devices may be included in network 205, including core switches, edge devices, top-of-rack devices, and other devices.

In general, network 205 may be the internes, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Each of host devices 210 represents a physical computing device or compute node or storage node that provides an execution environment for virtual hosts, virtual machines, containers, and/or other real or virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include like-numbered components that may represent the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes one or more processors 213, one or more communication units 215, one or more input devices 216, one or more output devices 217, and one or more storage devices 220. In the example shown, storage devices 220 may include kernel module 222 and virtual router module 224. Storage devices 220 may also include virtual machines 228A through 228N (collectively "virtual machines 228" and representing any number of virtual machines 228), when present, may execute on top of a hypervisor (not shown) or may be controlled by a hypervisor. One or more of the devices, modules, storage areas, or other components of host device 210A may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Processor 213 may implement functionality and/or execute instructions associated with host device 210A. Communication unit 215 may communicate with other devices or systems on behalf of host device 210A. One or more input devices 216 and output devices 217 may represent any other input and/or output devices associated with host device 210A. Storage devices 220 may store information for processing during operation of host device 210A. Each of such components may be implemented in a manner similar to those described herein in connection with alarm service 140 or otherwise.

Virtual router module 224 may execute multiple routing instances for corresponding virtual networks within data center 101 (FIG. 1) and may route packets to appropriate virtual machines executing within the operating environment provided by devices 110. Virtual router module 224 may also be responsible for collecting overlay flow data, such as Contrail Flow data when used in an infrastructure in which the Contrail SDN is employed.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition virtual and/or physical address space provided by storage device 220 into kernel space, which is protected and may be inaccessible by user processes.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines (e.g., one or more of host devices 210B through 210N, such as host device 210B and host device 210N). Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

In the example of FIG. 2, telemetry service 140 may include one or more processors 243, one or more communication units 245, one or more input devices 246, one or more output devices 247 and one or more storage devices 250. Storage devices 250 may include intent service 218, telemetry controller 221, telemetry subscription service 208, and telemetry collectors 214.

One or more of the devices, modules, storage areas, or other components of telemetry service 140 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

One or more processors 243 of telemetry service 140 may implement functionality and/or execute instructions associated with telemetry service 140 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device.

One or more communication units 245 of telemetry service 140 may communicate with devices external to telemetry service 140 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of alarm service 140 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of alarm service 140 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within telemetry service 140 may store information for processing during operation of telemetry service 140. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of telemetry service 140 and/or one or more devices or systems illustrated as being connected to telemetry service 140.

In some examples, one or more storage devices 250 are implemented through temporary memory, which may mean that a primary purpose of the one or more storage devices is not long-term storage. Storage devices 250 of alarm service 140 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Intent service 218 receives telemetry intent 230 that expresses, at a high level, telemetry requirements for generating and collecting telemetry data. The telemetry intent 230 may be in a natural language. As an example, a telemetry intent 230 may be "collect cpu resource usage metrics from all the devices at 1 minute granularity." As a further example, a telemetry intent 230 may be "collect memory resource usage from devices routerA, routerB and routerC." Intent service 218 may translate the telemetry intent 230 into one or more lower level telemetry commands and protocols that implement the telemetry intent 230. In some cases, a device may support more than one telemetry protocol. In such cases, intent service may translate the telemetry intent 230 using a protocol that may be selected according to criteria such as a priority assigned to the protocol, device capabilities with respect to the protocol, and overhead associated with the protocol. Further, in some aspects, intent service 218 may reconcile intents for multiple applications that request telemetry data from the same device. Intent service 218 can send the lower level telemetry commands and an indication of the selected protocol to telemetry controller 221 to update telemetry collection for affected devices.

Telemetry controller 221 can receive the lower level telemetry commands and an indication of the selected protocol. In some aspects, telemetry controller 221 maintains the most recent telemetry requirements for each device. Telemetry controller 221 can provision telemetry collectors 214 for devices such as leaf devices 203 and spine devices 202 that are specified by the telemetry commands and protocols as translated from telemetry intent 230.

Telemetry subscription service 208 receives requests to subscribe to telemetry data produced by devices. In some aspects, in response to receiving a subscription, telemetry controller 221 may provision telemetry collectors 214 if a telemetry collector has not already been provisioned for the device.

Telemetry collectors 214 collect telemetry data from devices. Telemetry collectors 214 can store collected data in a cache or database (not shown). Telemetry service 140 can provide the collected data to applications (e.g., applications 226) that have subscribed to the data.

Figure 3A:
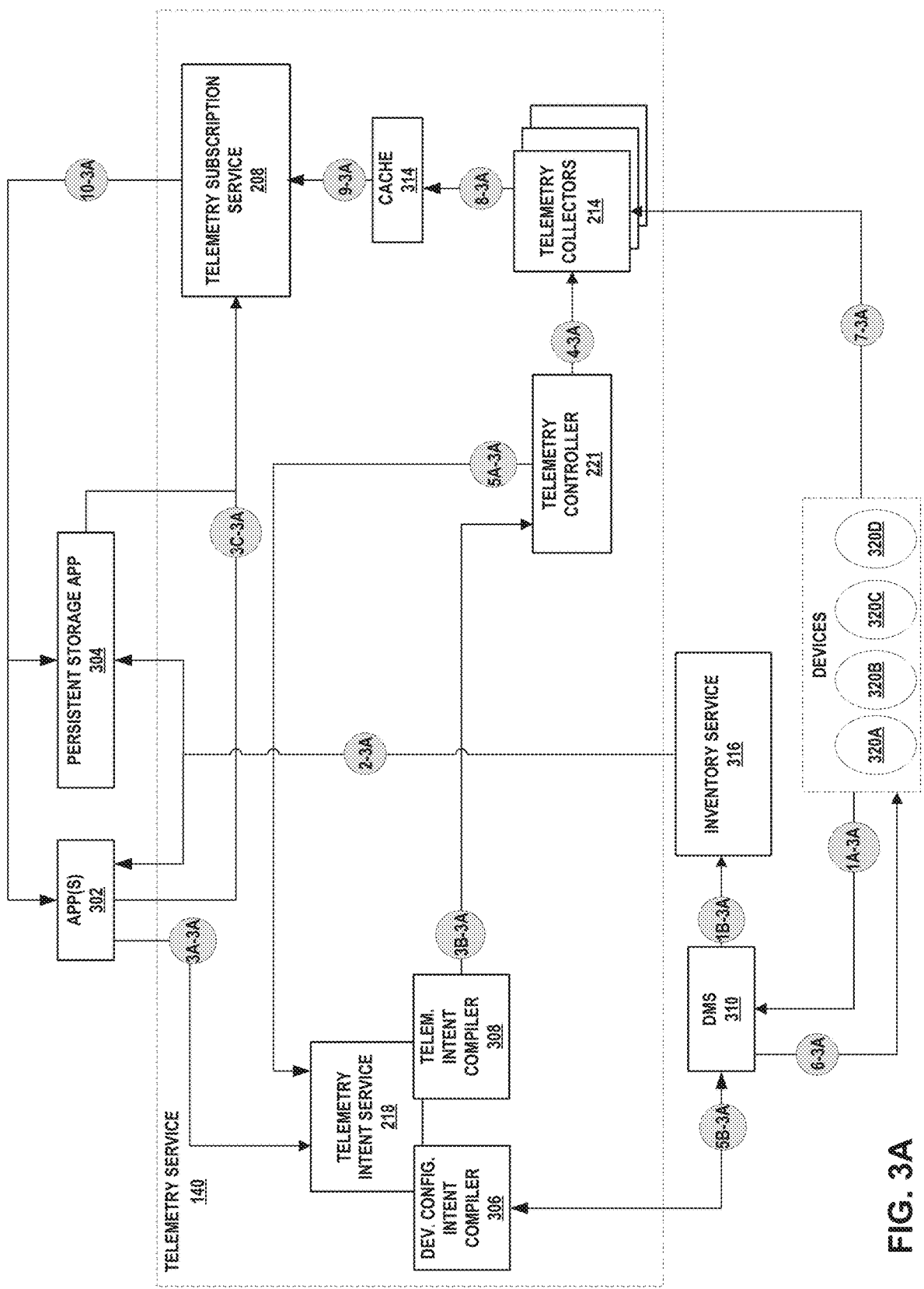
FIG. 3A is a block diagram illustrating a workflow in an intent based telemetry collection service, in accordance with one or more aspects of the present disclosure.
Figure 3B:
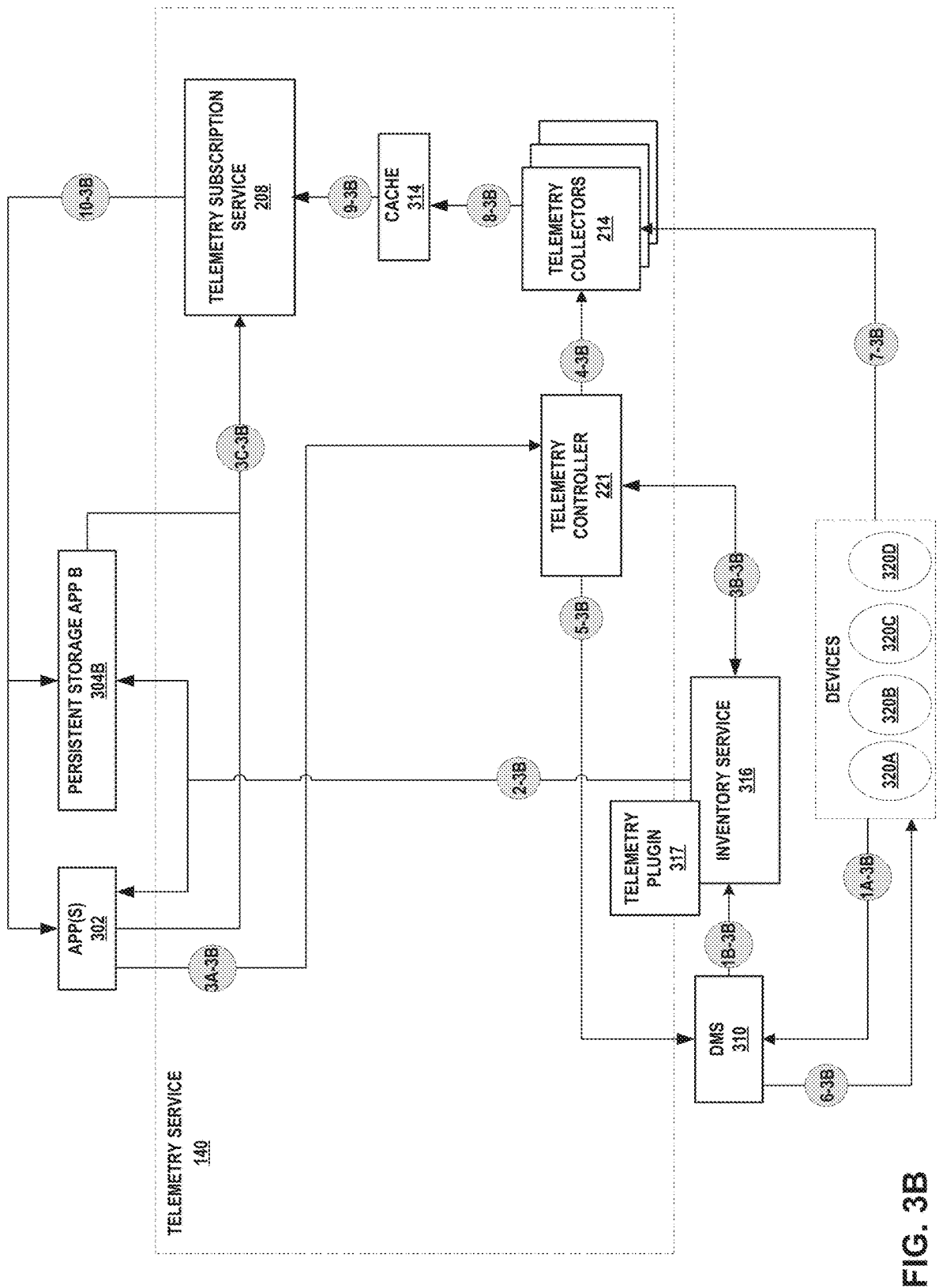
FIG. 3B is a block diagram illustrating another workflow in a telemetry collection service, in accordance with one or more aspects of the present disclosure.
Figure 4:
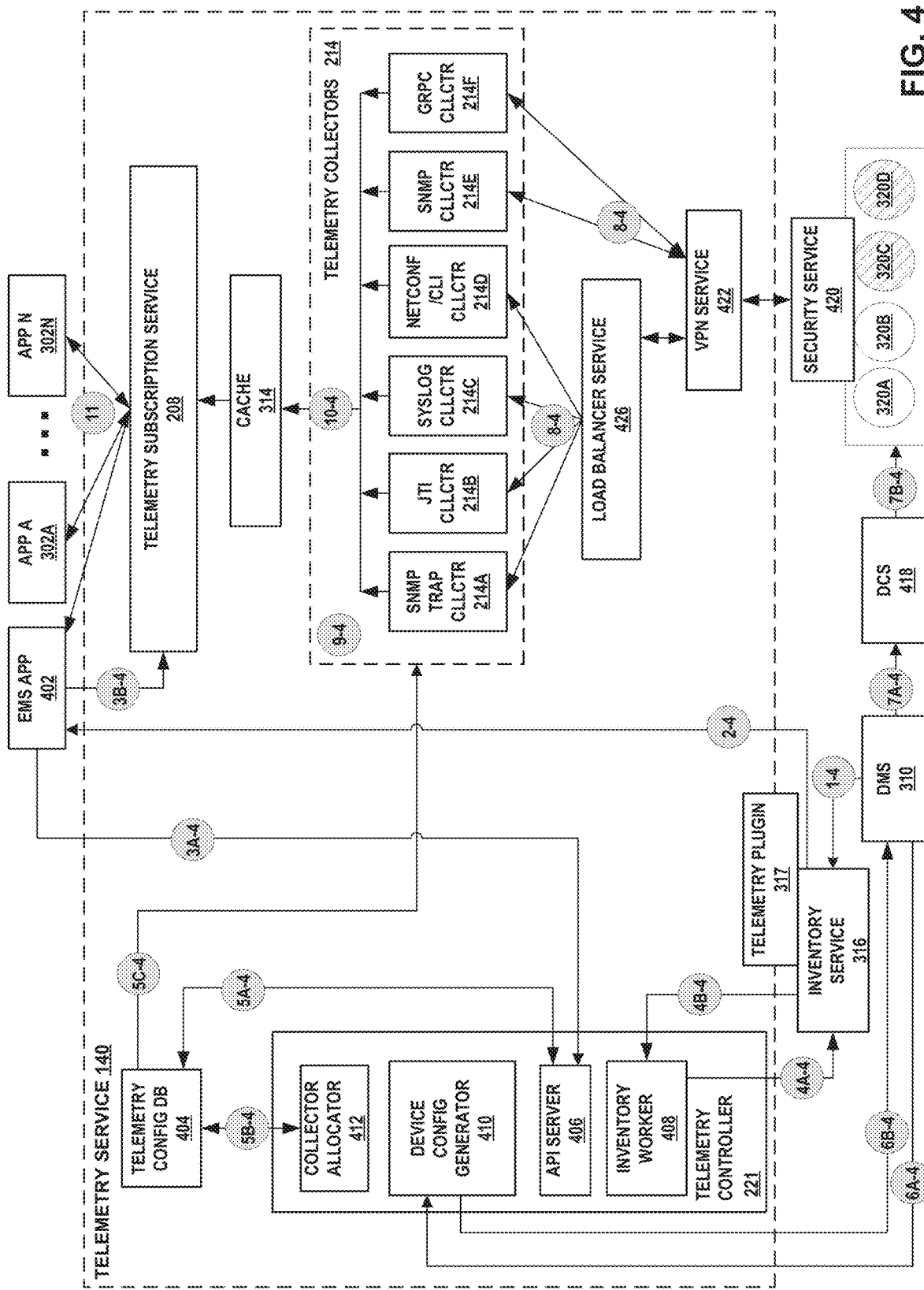
FIG. 4 is a block diagram illustrating details of an intent based telemetry collection service, in accordance with one or more aspects of the present disclosure.

FIGS. 3A and 3B illustrate a workflow through components of telemetry service 140, and FIG. 4 provides further details regarding telemetry service 140.

FIG. 3A is a block diagram illustrating a workflow in an intent based telemetry service HO, in accordance with one or more aspects of the present disclosure. The operations shown in FIG. 3A may provide an end-to-end workflow from application telemetry intent to configuring devices to provide telemetry data as specified by the telemetry intent.

Operations in the workflow are indicated by numerals in shaded circles in FIG. 3A. The operations shown in FIG. 3A may be performed by different components of telemetry service 140. In some aspect, the components may be microservices. Telemetry service 140 may track operations in the workflow. In some aspects, telemetry service 140 may utilize a state machine to track the progress of operations in a workflow. An example of such a state machine is described below with reference to FIG. 6.

Device Management Service (DMS) 310 discovers device and telemetry capabilities of devices 320 in a network (1A-3A). DMS 310 sends the discovered devices 320 and telemetry capabilities of devices 320 to inventory service 316 (1B-3A). In some aspects, DMS 310 may inform inventory service 316 the telemetry protocols that are supported by a device e.g., Simple Network Management Protocol (SNMP), SNMP Trap, Junos Telemetry Interface (JTI), Google Remote Procedure Call (gRPC), Network Configuration Protocol (NETCONF), Syslog etc.

Inventory service 316 can provide information to applications 302, 304 about the discovery of a new device or devices (2-3A).

Applications 302 that are configured to monitor telemetry data may indicate their intent and subscribe to the data. For example, an Element Management Service application may be configured to monitor telemetry data for devices in a network. An application 302 can send telemetry intent to telemetry intent service 218 (3A-3A). Different applications can generate different intents to monitor the same or different devices. A telemetry intent compiler 308 of telemetry intent service 218 can compile the telemetry intent and translate the telemetry intent into telemetry commands and/or telemetry configuration data. In some aspects, telemetry intent service 218 can reconcile intents received by multiple applications 302 for the same device. As an example, multiple applications may provide different telemetry collection intents. For instance, a first application may request that telemetry be collected every five minutes, while a second application may request that telemetry be collected every minute. Telemetry service 218 may reconcile the requests by requesting telemetry at the highest resolution of the multiple requests, in this example, every minute. Telemetry intent service 218 may send the translated telemetry intent to telemetry controller 221 (3B-3A).

Telemetry controller 221 can use the translated telemetry intent to update telemetry requirements for a device. As noted above, telemetry controller 221 can maintain the most recent telemetry requirements across applications 302 that have provided telemetry intent via telemetry intent service 218. In some aspects, when telemetry controller 221 initializes operation, it can request and/or receive previously translated intents from telemetry intent service 218. With respect to previously translated intents, telemetry intent service 218 can cache previous requests or generate compiled intents when telemetry controller 221 requests a replay of telemetry intent. Telemetry controller 221 can use the previously translated intents to determine devices to be monitored along with sensors to be monitored in order reconcile its state for devices to be monitored so as to be current with respect to application 302 intents with respect to telemetry data.

Applications 302 can subscribe for the telemetry data from telemetry subscription service 208 (3C-3A). Some applications may be interested in subscribing for existing telemetry data without explicitly generating any specific intent for device monitoring. As an example, persistent storage application 304 may be an application that obtains existing telemetry data from telemetry service 140 to maintain a history of telemetry data, but does not actively monitor device telemetry data. Such applications may subscribe to telemetry data (3C-3A) without providing an intent to telemetry intent service 318 (3A-3A) for compilation and transmission to telemetry controller 221 (3B-3A).

Telemetry controller 221 can provision telemetry collectors 214 to start collecting telemetry data based on the telemetry requirements received from telemetry intent service 218 (4-3A).

Telemetry controller 221 can determine a high level telemetry configuration intent based on the desired telemetry requirement(s) for a device and can send the telemetry configuration intent to telemetry intent service 218 (5A-3A). A device configuration intent compiler 306 of telemetry intent service 221 can translate telemetry configuration intent and issue a request to DMS 310 to configure one or more of devices 320 according to the translated telemetry configuration intent (5B-3A).

DMS 310 can configure devices 320 with telemetry configurations (6-3A). For example, DMS 310 may have previously obtained information (from operation 1A-3A) regarding the type of device and telemetry related protocol (s) supported by the device. DMS 310 can use this information to provide a device dependent configuration to devices 320.

Following configuration by DMS 310, devices 320 may be configured to provide telemetry data to telemetry collectors 214 (7-3A). In some aspects, telemetry collector 214 can collect telemetry data from devices 320 using push or pull techniques. Different telemetry collectors can use different mechanisms, for example, some telemetry collectors 214 may use push techniques to collect telemetry data from devices 320 while other telemetry collectors 214 use pull techniques.

Telemetry collectors 214 publish their collected telemetry data to cache 314 (8-3A). In some aspects, cache 314 may be implemented as a Redis database. A Redis database is a distributed database that can implement an in-memory key-value database.

Telemetry subscription service 208 can receive telemetry data from cache 314 based on the subscriptions provided by applications 302, 304 (9-3A). Telemetry subscription service 208 can provide the telemetry data to applications 302, 304 based on their respective subscriptions (10-3A). In some aspects, applications 302, 304 can receive the data they have subscribed to from telemetry subscription service 208 via a gRPC channel.

FIG. 3B is a block diagram illustrating workflow in a telemetry service, in accordance with one or more aspects of the present disclosure. In some implementations, telemetry service 140 may configured without an intent service 218. FIG. 3B illustrates a telemetry subscription workflow for such implementations. As in FIG. 3A described above, operations in the workflow illustrated in FIG. 3B are indicated by numerals in shaded circles. The operations shown in FIG. 3B may be performed by different components of telemetry service 140. In some aspect, the components may be microservices.

Device Management Service (DMS) 310 discovers device and telemetry capabilities of devices 320 in a network (1A-3B). DMS 310 sends the discovered devices 320 and telemetry capabilities of devices 320 to inventory service 316 (1B-3B). In some aspects, DMS 310 may inform inventory service 316 the telemetry protocols that are supported by a device e.g., SNMP, SNMP Trap, JTI, gRPC, NETCONF, Syslog etc.

Inventory service 316 can provide information to applications 302, 304 about the discovery of a new device or devices (2-3B). Applications 302, 304 can learn, from inventory service 316, the telemetry capabilities for a given device. Telemetry capabilities may be a superset of different protocols and corresponding sensors for which telemetry data can be collected for a given device.

Inventory service 316 is aware of the telemetry capabilities of devices 320. For example, in some aspects, inventory service 316 can learn telemetry capabilities of devices 320 via a telemetry plugin 317. Telemetry plugin 317 may maintain a table of protocols and corresponding sensors that are supported by telemetry service 140. Applications 302, 304 can query inventory service 316 to obtain the telemetry capabilities prior to sending telemetry requirement requests to telemetry controller 221.

Applications 302, 304 can generate their respective telemetry requirement requests using the telemetry capabilities and transmit their respective telemetry requirement requests to telemetry controller 221 (3A-3B).

In order to begin monitoring device telemetry, applications 302 can issue a telemetry request to telemetry controller 221. For example, in response to a device notification received from inventory service 326 (operation 2-3B above), an application 302 can issue the telemetry request to telemetry controller 221. In some aspects, applications 302 issue telemetry requests to telemetry controller 221 via a gRPC channel. In such aspects, the application 302 may be the initiator of the gRPC connection and telemetry controller 221 may act as a gRPC server.

The telemetry request may specify one or more telemetry protocols and corresponding sensors for which telemetry data is to be collected for a given device. As an example, an application 302 may issue a telemetry request to telemetry controller 221 that may specify that the SNMP protocol is to be used to collect telemetry data from a Management Information Base (MIB) on device 320A. In some aspects, telemetry controller 221 can combine multiple telemetry requests received from multiple applications 302 by creating a union of the multiple telemetry requests. For example, telemetry controller 221 can combine data representing a first telemetry data collection intent with data representing a second telemetry data collection intent to create a union of telemetry data collection intent.

In case of an error related to a telemetry request, in some aspects, an application 302 may resend the telemetry request to telemetry controller 221. For example, if the gRPC connection between an application 302 and telemetry controller 221 fails, then application 302 can reestablish the gRPC connection with telemetry controller 221 to send new or updated telemetry requests to telemetry controller 221.

When a new telemetry request is received by telemetry controller from an application 302, telemetry controller 221 may issue a request to inventory service 316 to replay device information for a specific device 320. Replay may be useful because device information may change over time. Replay facilitates telemetry controller 221 receiving the latest information regarding device capabilities. Telemetry controller 221 may reconcile its state for devices to be monitored and telemetry requests that it has received from applications 302 for the specific device 320. In some aspects, communication is performed over a gRPC channel between telemetry controller 221 and inventory service 316. Additionally, when telemetry controller 221 initializes, telemetry controller 221 may use a gRPC channel to request replay for each device that telemetry controller 221 is monitoring. In some aspects, telemetry controller 221 can generate a batch request with a list of devices 320 for which replay is desired.

Applications 302 can issue a subscription request to subscribe for the telemetry data from telemetry subscription service 208 (3C-3B). In some aspects, a subscription request may specify a device identifier, desired protocols, and corresponding sensors from which the application 302 wants to receive data. In addition, an application identifier may be included to identify the application 302 that is interested in collecting telemetry data. Telemetry controller 221 can manage requests from multiple applications, and as noted above, may reconcile requests received from multiple applications.

In some aspects, an application such as persistent storage application 304 may directly subscribe with telemetry subscription service 120 to receive desired telemetry data Such applications may subscribe to telemetry data (3C-3B) without first informing telemetry controller about devices to be monitored and corresponding sensors from which data is to be collected (i.e., the application does not perform operation 3A-3B). In this case, the application may assume that an appropriate telemetry collector 214 has already been provisioned. However, such provisioning is not a requirement, and a telemetry controller 214 may be provisioned before or after the application subscribes to telemetry data.

Telemetry controller 221 can provision telemetry collectors 214 to start collecting telemetry data based on the telemetry requirements and/or capability information received from applications 302 and inventory service 316 (4-3B).

Telemetry controller 221 can determine desired abstract telemetry configuration parameters using the telemetry requirements and/or capability information and can send the telemetry configuration to DMS 310 to request that DMS 310 configure devices according to the abstract telemetry configuration parameters (5-3B). The abstract telemetry configuration parameters can be a device independent specification of protocols, parameters, and desired telemetry data.

DMS 310 can translate the abstract telemetry configuration parameters into a platform dependent telemetry configuration that can be used to configure devices 320 (6-3B). For example, DMS 310 may have previously obtained information (from operation 1A-3B) regarding the type of device and telemetry related protocol(s) supported by the device. DMS 310 can use this information to provide a device dependent configuration to devices 320.

Following configuration by DMS 310, devices 320 may be configured to provide telemetry data to telemetry collectors 214 (7-3B). In some aspects, telemetry collector 214 can collect telemetry data from devices 320 using push or pull techniques. Different telemetry collectors can use different mechanisms, for example, some telemetry collectors 214 may use push techniques to collect telemetry data from devices 320 while other telemetry collectors 214 use pull techniques.

Telemetry collectors 214 publish their collected telemetry data to cache 314 (8-3B) some aspects, only the most recent data for a device may be available in cache 314. In some aspects, cache 314 may be implemented as a Redis database. A Redis database is a distributed database that can implement an in-memory key-value database.

Telemetry subscription service 208 can receive telemetry data from cache 314 based on the subscriptions provided by applications 302, 304 (9-3B). Telemetry subscription service 208 can provide the telemetry data to applications 302, 304 based on their respective subscriptions (10-3B). In some aspects, applications 302, 304 can receive the data they have subscribed to from telemetry subscription service 208 via a gRPC channel.

FIG. 4 is a block diagram illustrating further details of a telemetry service, in accordance with one or more aspects of the present disclosure. As shown in FIG. 4, telemetry service 140 includes components described above with respect to FIGS. 2 and 3, that is, telemetry controller 221, telemetry subscription service 208, telemetry collectors 214, inventory service 316, telemetry plugin 317 and DMS service 310. In addition, as shown in FIG. 4, telemetry service 140 includes telemetry configuration database 404, collector allocator 412, device configuration generator pool 410, API server 406, inventory worker pool 408, load balancer service 426, Virtual Private Network (VPN) service 422 and security service 420. Telemetry controller 221 may include collector allocator 412, device configuration generator pool 410, API server 406, and inventory worker pool 408.

A sequence of operations for the components of telemetry service 140 illustrated in FIG. 4 will now be described. Like FIGS. 3A and 3B, operations are identified by a numeral in a shaded gray circle.

Device Management Service (DMS) 310 discovers device and telemetry capabilities of devices 320 in a network. DMS 310 sends the discovered devices 320 and telemetry capabilities of devices 320 to inventory service 316 (1-4). In some aspects, DMS 310 may inform inventory service 316 the telemetry protocols that are supported by a device e.g., SNMP, SNMP Trap, HI, gRPC, NETCONF, Syslog etc.

Inventory service 316 can provide information to applications 302, 402 about the discovery of a new device or devices (2-4). Applications 302, 402 can learn, from inventory service 316, the telemetry capabilities for a given device. As noted above, telemetry capabilities may be a superset of different protocols and corresponding sensors for which telemetry data can be collected for a given device.

Applications 302, 402 can generate their respective telemetry requirement requests using the telemetry capabilities and transmit their respective telemetry requirement requests for monitoring one or more sensors of a given device 320 to telemetry controller 221 (3A-4). The request may be received by API server 406 of telemetry controller 221. API server 406 may be a point of entry for an application request and may handle create, release, update and delete (CRUD) requests with respect to collecting telemetry data. API server 406 may validate an incoming request (e.g., validate the tenant, protocol requested and its supported sensors, some aspects, a telemetry request from application 302, 402 specifies set of sensors and protocols for which telemetry should be collected for a given device. On successful validation, API server 406 may create a database entry for each unique device with well-defined metadata describing the validated request. Examples of messages that may be supported by various implementations of API server 406 and/or telemetry server 221 to support requests of applications 302, 402 made to telemetry controller 221 are described in FIG. 12.

Telemetry controller 221 can track telemetry requirements received from different applications 302, 402. Applications 302, 402 may determine telemetry sensors supported by telemetry service 140 for a given device based on device properties which an application 302, 402 can receive from inventory service 316. In some aspects, telemetry plugin 317 may provide such device properties. In some aspects, an application 302, 402 can issue a telemetry request to telemetry controller 221 in response to a device notification received from inventory service 326 (operation 2-4 above). In some aspects, applications 302 issue telemetry requests to telemetry controller 221 via a gRPC channel. In such aspects, the application 302 may be the initiator of the gRPC connection and telemetry controller 221 may act as a gRPC server. As noted above, in some aspects, telemetry controller 221 can combine multiple telemetry requests received from multiple applications 302, 402 by creating a union of the multiple telemetry requests.

Applications 302, 402 can issue a subscription request to subscribe for the telemetry data from telemetry subscription service 208 (3B-4). In some aspects, a subscription request may specify a device identifier, desired protocols, and corresponding sensors from which the application 302 wants to receive data. Telemetry controller 221 can manage requests from multiple applications, and as noted above, may reconcile requests received from multiple applications. In some aspects, an application 302, 402 may send a subscription request to telemetry subscription 208 via a gRPC channel. In some aspect, an EMS application 402 may initiate a gRPC connection with telemetry subscription service 208 to subscribe for specific telemetry data from a device 320. A description of APIs that may be used by applications 302, 402 can be found in FIG. 13.

In some aspects, when telemetry service 140 initializes, it may initiate a connection with inventory service 310 (4A-4). For example, telemetry service 140 may initiate a gRPC connection with inventory service 310. The connection can be used to receive device specific and telemetry specific information from inventory service 316. In some aspects, for each device monitored by telemetry service 140, telemetry controller 211 may specify the specific telemetry information to be received from inventory service 316. For example, telemetry controller 211 may specify to inventory service 316 that SNMP or III config information is to be received from a particular device.

Inventory service 316 can send the requested information to telemetry controller 221 for the particular device (4B-4). Additionally, inventory service 316 may send updated information for a device to telemetry controller 221. For example, if a Netconf username/password changes, or the operating system (OS) version changes, etc., inventory service 316 may send an indication of the update to telemetry controller 221. After receiving information for a device, telemetry controller 221 can reconcile a telemetry configuration database 404 with the updated device information. Further, when a device that is configured to be monitored by telemetry service 140 is removed or deleted from a network system, inventory service 316 may send a notification to telemetry controller 221 of the removal or deletion. Telemetry controller 221 can remove the device from telemetry configuration database 404.

Inventory service 316 may maintain information about sensors for different protocols that may be supported by telemetry service 140. Telemetry plugin 317 of inventory service 316 may provide information about the sensors to inventory service 316. Applications 302, 402 may obtain this information from inventory service 316 as discussed above regarding operation 3A. An application 302, 402 may use the information to select a subset of sensors for monitoring.

In some aspects, an inventory worker 408 issues the request for information from inventory service 316 and processes any data received from inventory service 316. Inventory worker 408 can communicate with the inventory service 316 to obtain more detailed information about a device and its supported protocols. A database entry for the device in telemetry configuration database can be updated with the device information.

Telemetry controller 221 creates a copy of information received from inventory service 316 and telemetry requirements received from applications 302, 402 for a device in telemetry configuration database 404 (5A-4). This information can include the telemetry data to be collected for the device. As discussed above, API server 406 of telemetry controller 221 may create entries in configuration database 404 that contain the information received from applications 302, 402.

Collector allocator 412 of telemetry controller 221 can determine a protocol specific collector 214 to be assigned to monitor a particular device (5B-4). For example, collector allocator 412 may determine a collector 214 that is a Kubernetes pod implementing a collector 214 for a specific protocol. There are different collectors for different protocols. In the example shown in FIG. 4, there is a collector 214A for SNMP traps, a collector 214B for the HI protocol, a collector 214C for the Syslog protocol, a collector 214D for the Netconfig/Command Line Interface (CLI) protocol, collector 214E for the SNMP protocol, and collector 214F for the gRPC protocol. There may be more protocol specific collectors 214 for other protocols not shown in FIG. 4. Further, there may be more than one telemetry collector 214 for a particular protocol. Telemetry controller 221 can maintain an allocation map of telemetry collectors 214 in telemetry configuration database 404 that indicates how devices are allocated to telemetry collectors 214. Telemetry controller 221 can periodically evaluate the allocation map. For example, telemetry controller 221 may periodically redetermine the allocation map and reassign devices depending on the protocol and the loads experienced by telemetry collectors 214 for the protocol.

Each collector of collectors 214 determines its assigned work for telemetry collection using information from telemetry configuration database 404 (5C-4). For example, each Kubernetes pod in SNMP collector 214E can determine the specific devices to be polled by the pod.

Telemetry controller 221 can query DMS 310 to request that DMS 310 provide a telemetry configuration template (6A-4). In some aspects, the telemetry configuration template may be a jinja template. In some aspects, a gRPC channel is established between telemetry controller 221 and DMS 310. A device configuration generator 410 of telemetry controller 221 may issue the query for the configuration template via the gRPC channel, DMS 310 can send the requested telemetry configuration template in response to the request by device configuration generator 410.

Device configuration generator 410 of telemetry controller 221 can generate a telemetry protocol specific configuration based on the telemetry configuration template and the specified protocol and send the generated telemetry protocol specific configuration to DMS 310 (6B-4). Device configuration generator 410 can render the jinja template to generate the telemetry protocol specific configuration and send the telemetry protocol specific configuration to DMS 310 via the gRPC channel.

DMS 310 can send the telemetry protocol specific configuration to device collection service (DCS) 418 (7A-4). DCS 418 can maintain connectivity with devices and can push the configuration to the appropriate devices 320 (7B-4).

Following configuration by DMS 310 via DCS 418, devices 320 may be configured to provide telemetry data to telemetry collectors 214 (8-4). In some aspects, telemetry collector 214 can collect telemetry data from devices 320 using push or pull techniques. For example, some devices may stream telemetry data to the appropriate collector 214. Some devices may respond to polling requests for telemetry data received from a collector 214 to provide their telemetry data to telemetry collectors 214.

In some cases, one or more devices 320 may be behind a router or switch that performs network address translation (NAT). In such cases, the device performing NAT may not allow requests initiated by a telemetry collector 214 to reach a specified device 320. To address this case, in some aspects, an Internet Protocol Security (IPSec) tunnel may be configured between devices 320 and collectors 214. In the example illustrated in FIG. 4, Virtual Private Network (VPN) service 422 establishes an IPSec tunnel between devices 320 collectors 214. VPN service 422 may be a tunnel end point on the collector side of the IPSec tunnel, and security service 420 may be a tunnel end point terminating the IPSec tunnel on the device 320 side of the IPSec tunnel. devices 320. In some aspects, security service 420 may be a security service provided by the vSRX virtual security appliance available from Juniper Networks of Sunnyvale, California.

Telemetry collectors 214 publish their collected telemetry data to cache 314 (9-4). As shown in FIG. 4, different collectors 214 may process telemetry data for a respective telemetry protocol. For example, SNMP trap collector 214A processes SNMP traps. In some aspects, SNMP Traps may be sent to an SNMP proxy virtual IP address (VIP) from multiple devices 320. For example, load balancer 426 may be associated with an SNMP proxy VIP. Load balancer 426 may receive SNMP traps and distributed the traps across multiple instances of SMTP trap collector 214A so as to balance the processing load across the multiple instances. In some aspects, each of the multiple instances of SNMP trap collector 214A may be one or more Kubernetes pods.

III collector 214B can process JTI streams. In some aspects, JTI user datagram protocol (UDP) traffic is sent to a service endpoint VIP address associated with load balancer 426. Load balancer 426 may distribute the JTI UDP traffic to instances of JTI collector 214B. In some aspects, JTI UDP traffic from a specific device is always sent to the same instance of JTI collector 214B to avoid reordering issues. In some aspects, instances of JTI collector 214B may be one or more Kubernetes pods.

Syslog collector 214C receives syslog data from devices 320 configured to provide such data. In some aspects, the syslog data may be pushed to a VIP address associated with the syslog collector 2140. The VIP address may be a VIP address for load balancer 426 that is a proxy IP address for syslog collector 214C. In some aspects, an instance of syslog collector 214C may be one or more Kubernetes pods.

Instances of Netconf collector/CLI 214D can concurrently issue CLI commands to request telemetry data to each of one or more devices configured to provide Netconf data. The one or more devices may concurrently process the CLI command and return requested telemetry data to the requesting instance of Netconf collector/CLI 214D. In some aspects, an instance of Netconf collector/CLI 214D may be one or more Kubernetes pods.

Instances of SNMP collector 214E can concurrently poll devices to request SNMP-based telemetry data from devices configured to provide such data. For example, instances of SNMP collector 214E may collect telemetry data from one or more MIBs on devices 320 configured to maintain such data. In some aspects, an instance of SNMP collector 214E may be one or more Kubernetes pods that collect the SNMP-based telemetry data from devices 320 allocated to the pod.

Instances of gRPC collector 214F can concurrently poll devices to request telemetry data from devices configured to provide such data via gRPC. In some aspects, an instance of gRPC collector 214F may be one or more Kubernetes pods that collect telemetry data from devices 320 allocated to the pod. In some aspects, gRPC collector 214F can request to receive data at a particular rate.

In some aspects, load balancer 426 may not be involved with telemetry collectors 214 that collect telemetry information by polling devices (e.g., SNMP collector 214E and gRPC collector 214F). In the case of telemetry collectors 214 that poll devices for telemetry data, the polled device responds directly to the telemetry collector instance 214 that initiated the polling request.

Data collected by telemetry collectors 214 may be stored in cache 314 (10-4). As noted above, in some aspects, only the most recent data for a device may be available in cache 314. In some aspects, cache 314 may be implemented as a Redis database.

Telemetry subscription service 208 can receive telemetry data from cache 314 based on the subscriptions provided by applications 402, 302. Telemetry subscription service 208 can provide the telemetry data to applications 402, 302 based on their respective subscriptions (11-4). In some aspects, applications 402, 302 can receive the data they have subscribed to from telemetry subscription service 208 via a gRPC channel.

In some aspects, one or more of the services described above that are part of telemetry service 140, e.g., telemetry controller 221 and its components, inventory service 316, telemetry collectors 214, telemetry subscription service 208 can be implemented as a microservice. For example, the microservices that make up telemetry service 140 may be loosely coupled with one or more other microservices of telemetry service 140 and may implement lightweight protocols to communicate between microservices. In some aspects, one or more of the services described above may be implemented as Kubernetes deployment constructs, including pods and containers.

Telemetry service 140 may monitor itself to facilitate fault tolerance and dynamic scaling. For example, telemetry service 140 may monitor resource utilization such as processor and memory usage along with other metrics such as queue sizes, device counts, application counts, subscription rates, add rates, update rates, delete rates etc. Telemetry service 140 may periodically or continuously monitor health metrics that can indicate if a component of telemetry service 140 is becoming bottleneck for a given load, thereby causing a new instance of the component that has become a bottleneck to be spawned (e.g., created). In some aspects, a set of rules may be defined to monitor the health metrics for a given component of telemetry service 140 and are then used to make decisions for creating new microservice instances for scaling up telemetry service 140 capability. Similarly, the same mechanism can be used to determine if load conditions are low enough to allow scaling down telemetry service 140 capability. FIGS. 14A and 14B illustrate rules and health metrics that can be used for scaling up or down various components and services of telemetry service 140.

Examples of horizontal scalability and fault tolerance of various components of telemetry service 140 will now be described. API server 406 can be fault tolerant. For example, in case of failure a new instance of API server 406 can be dynamically spawned. Further, multiple instances of API server 406 can be spawned (e.g., created) to load balance workload across different instances. For example, in Kubernetes based implementations, telemetry service 140 can utilize deployment constructs that can automatically spawn instances of API server 406 in case of failure. The states of databases utilized by API server 406 (e.g., telemetry configuration database 404) can be checkpointed. Thus, after a restart or instance crash, API server 406 can converge to a consistent state resulting in minimal or no service impact.

Multiple instances of device configuration generator 410 may be created. Each instance can be assigned a subset of devices, and each instance can independently determine the desired device telemetry configuration for different platform families of devices assigned to the instance. Once an appropriate configuration is determined by the instance of device configuration generator 410 to which the device is assigned, device configuration generator 410 can independently configure the device using DMS 310. If an instance of device configuration generator 410 crashes or fails, the devices assigned to the failed instance can be reallocated across the remaining instances. High availability and fault tolerance can be is achieved using Kubernetes deployment construct that can dynamically spawn new instances of device configuration generator 410 when an existing instance crashes.

Multiple instances of inventory service manager 316 can be maintained as a pool of instances. One or more devices can be assigned to each instance in the pool, and the instances can concurrently discover device capabilities. In addition, each instance of inventory service manager 316 can monitor for any updates in device capabilities. For example, each instance can continuously listen update notifications with respect to a device assigned to the instance. If any instance crashes, a new instance can be spawned, and the set of devices assigned to the crashed instance can be reallocated to the new instance or across all available instances. Similar to other microservices of telemetry service 140, high availability can be achieved in some aspects using Kubernetes deployment construct which dynamically and automatically spawn new instances of service in case of existing instances crashes.

As discussed above, there can be multiple types of telemetry collectors 214 that provide support for different telemetry protocols e.g., JTI, gRPC, SNMP, Syslog, Netconf etc. Each telemetry collector 214 can be designed as an independent microservice with multiple instances that horizontally scale to meet monitoring requirements. As an example, Netconf collector 214D can be designed as a service with multiple instances. Each instance of Netconf collector 214D can be assigned a set of devices for which it monitors and collects data. As the number of devices configured for Netconf scale up, more instances of Netconf collector 214D can be spawned to handle the additional load. If an instance of Netconf collector 214D crashes or fails, then a new instance can be automatically spawned using the Kubernetes infrastructure. Devices assigned to the instance that crashed can be reallocated to the new instance or other available instances. Similar to other microservices, high availability can be achieved in some aspects by using Kubernetes deployment constructs which dynamically and automatically spawn new instances of a telemetry collector 214 if an existing instance crashes.

Telemetry subscription service 208 can horizontally scale for a large number of concurrent consumers (e.g., applications 302, 402). Multiple instances of telemetry subscription service 208 can be created where each instance can independently serve a disjoint set of requests for telemetry data. If an instance of telemetry subscription service 208 crashes or fails, requests can be distributed across available instances. Horizontal scaling of telemetry subscription service 208 can be facilitated by dynamically spawning more instance as the number of requests grows. High availability can be achieved using Kubernetes deployment constructs which can dynamically and automatically spawn a new instance of telemetry subscription service 208 if an existing instance crashes or fails.

Modules illustrated in FIGS. 1, 2, 3A, 3B and 4 (e.g., components of telemetry service 140) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Figure 5:
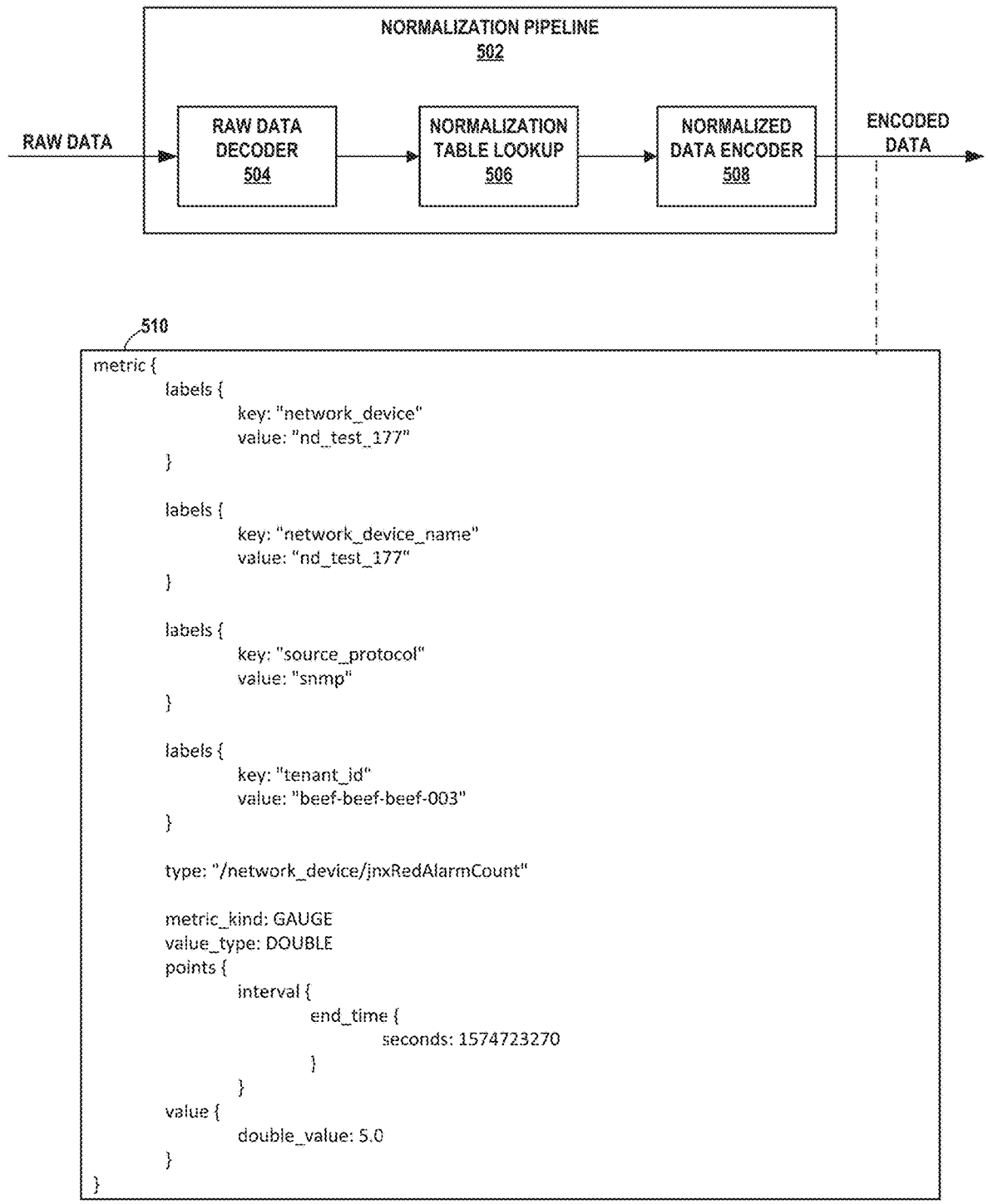
FIG. 5 is a conceptual diagram illustrating an example of telemetry data normalization in accordance with one or more aspects of the present disclosure.

FIG. 5 is a conceptual diagram illustrating an example telemetry data normalization pipeline in accordance with one or more aspects of the present disclosure. Different telemetry protocol collectors 214 may collect similar metrics, but there may be differences in the raw data format and meaning for the metrics. For example, different telemetry protocol collectors 214 may use different units, have different scales etc. In some aspects, a telemetry protocol collector 214 may implement a data normalization pipeline 502. Data normalization pipeline 502 can include raw data decoder 504, normalization table lookup 506, and normalized data encoder 508.

Raw data decoder 504 translates raw data received as input from a device into a set of <key, value> pairs, where a 'key' represents a protocol specific unique metric name and 'value' can be the most recent measurement of the metric.

Normalization table lookup 506 can use the protocol and key to perform a lookup in normalization table to determine the output normalized metric name that can be consistent across different protocols for the same metric. In some aspects, the normalization metric table incorporates domain knowledge for the telemetry protocol and may be auto generated based on a schema that maps the raw data metric name to the normalized metric name.

Normalized data encoder 508 encodes the metric name and raw data into a standardized telemetry format e.g. OpenConfig, or google telemetry format before publishing the telemetry data to telemetry subscription service 208. Metric 510 is an example of a normalized metric that may be published after encoding by normalized data encoder 508.

Figure 6:
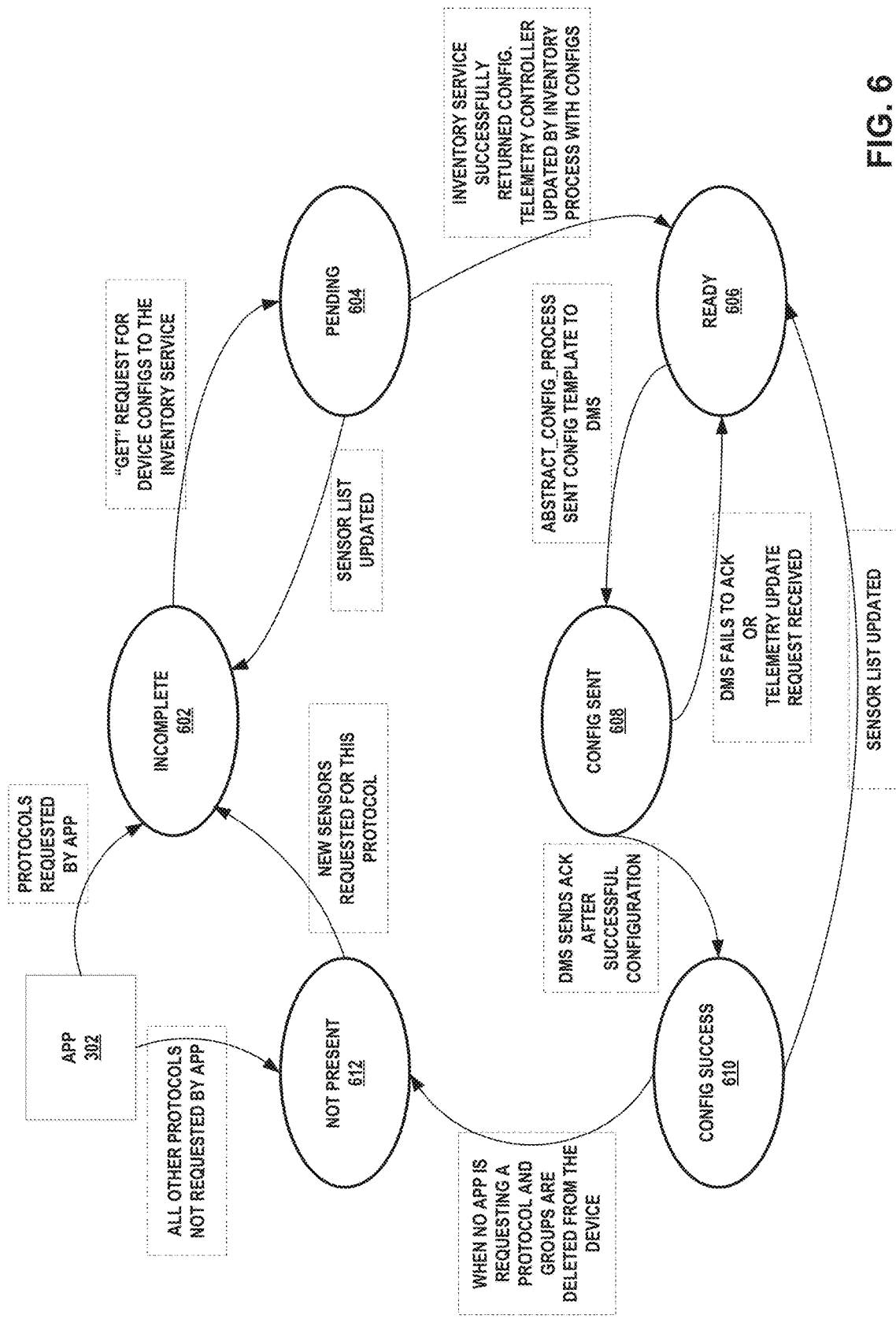
FIG. 6 is a conceptual diagram illustrating a telemetry collection state machine in accordance with one or more aspects of the present disclosure.

FIG. 6 is a conceptual diagram illustrating an example telemetry collection state machine in accordance with one or more aspects of the present disclosure. Components of telemetry service 140 may operate on a control plane and a data plane. For example, telemetry controller 221 and inventory service 316 may operate on the control plane and telemetry collectors 214 may operate on the data plane. The telemetry state machine facilitates seamless functioning of the telemetry controller 221 as it accepts a request and makes a device ready for telemetry collector pick-up. The telemetry state machine 600 can provide a systematic way for different telemetry service 140 components to recognize which devices they must currently serve. Furthermore, the telemetry state machine 600 can facilitate identifying the root cause when unexpected behavior occurs.

As described above, telemetry service 140 may have telemetry collectors 214 that support different telemetry collection protocols. In some aspects, each of the protocols has an associated telemetry collection state machine. Transitions from one state to another are indicated by arrowed connectors between states. The event or events that may trigger a state transition or indicated by text in dotted boxes in FIG. 6.

In some aspects, the protocol state is maintained on a per-device, per-protocol basis. Additionally, in some aspects, a protocol state machine is contingent on an application whether an application requested the protocol for the target device; and so, the status of the current operation being executed by the telemetry controller 221 (FIG. 4).

In some aspects, a protocol state machine can transition between six states as illustrated in FIG. 6. The six states may be Incomplete 602, Pending 604, Ready 606, ConfigSent 608, ConfigSuccess 610, and NotPresent 612. Transitions between the states may be tightly-coupled with, and may result from, the execution of various components of telemetry controller 221. These steps executing in the components of telemetry controller 221 can represent events that trigger state transitions. The components of telemetry controller 221 and the state transitions that may be the result of operations performed by the component will now be described with reference to components described above in FIGS. 2, 3A, 3B and 4.

As discussed above, API server 406 may be the point of entry for an application request regarding telemetry collection for a device. API server 406 may validate an incoming request (e.g., validate the tenant, protocol requested and its supported sensors, reporting rate etc.). An entry can be made in telemetry configuration database 404 for the device. The entry can include the requested protocol and an identifier of an application requesting telemetry data. If more than one application requests telemetry data for the device, the protocol requested by the additional application and identifier for the additional application may be appended to the database entry for the device. In some aspects, the initial state for a protocol is NotPresent 612. When an application 302, 402 requests telemetry collection for a device, the protocol state for the device and requested protocol can transition to Incomplete 602.

Inventory worker 408 can iteratively pick up devices having any protocol state of Incomplete 602. For each such protocol, inventory worker 408 can transition the state to Pending 604. Inventory worker 408 can communicate with inventory service 316 to obtain more detailed information about the device and its supported protocols. In some aspects, inventory worker 408 can obtain a device name, device IP address, device family, and protocol specific metadata like device port, private key, auth key, SNMP version etc. For each protocol that inventory worker 408 was able to obtain information, inventory worker 408 can transition the state to Ready 606. A database entry for the device in telemetry configuration database 402 can be updated with the newly added device information. In the event of a failure of inventory worker 408 to obtain information for a protocol from inventory service 316, the protocol state transitions from Pending 604 and reverts to Incomplete 602. This facilitates that in a subsequent iteration of inventory worker 408, the protocol states can be correctly picked up again to request data from the inventory service 316.

In some cases, a protocol may require additional configuration on devices supporting the protocol. Examples of such protocols include gRPC, SNMP Traps, Syslog and JTI. Examples of the additional configuration data can include the host IP address/Port on which the packets are to be delivered, the report rate for configured sensor, etc. Device configuration generator 410 searches for such protocols where the state is Ready 606. In some aspects, device configuration generator 410 obtains an abstract telemetry configuration template from DMS 310, which may manage such templates. The templates may be XML templates or Jinja templates that specify, abstract telemetry configuration parameters. An abstract telemetry configuration template may include information such as a host IP address/Port to deliver packets to, the report rate for a configured sensor, etc. Device configuration generator 410 can process the abstract telemetry configuration template to generate a protocol specific configuration. Device configuration generator 410 can send the generated protocol specific configuration to DMS 310. The state machine transitions the state to ConfigSent 608.

DMS 310 can send an acknowledgment to device configuration generator 410 upon successfully configuring the device with the protocol specific configuration. The state machine then transitions to ConfigSuccess 610, which may be the concluding state for an operational device providing telemetry data. The device may now be fully ready to send telemetry data to the target port of a corresponding telemetry collector 214.

A failure of DMS 310 to acknowledge successfully configuring the device with the protocol specific device configuration can cause the state machine to transition back to Ready 606 (from ConfigSent 608). Reverting the state back to Ready 606 can result in another attempt to configure the device during a subsequent iteration of the device configuration generator 410.

As noted above, some protocols do not require a protocol specific configuration to be pushed to a device. Examples of such protocols include Netconf/CLI, gRPC and SNMP. In cases where protocols do not require a protocol specific configuration, the state machine can maintain Ready 606 as their finishing state.

As can be seen from the above, in some aspects, at the conclusion of a process iteration of telemetry controller 221, the desired operational protocol state can be either Ready 606 or ConfigSuccess 610 depending on the protocol. When state machine 600 indicates that a device in in a desire operational protocol state, a protocol specific telemetry collector 214 can collect telemetry data for requested devices at the specified intervals. The collected telemetry data can be streamed to cache 314 for consumption. Telemetry subscription service can obtain the telemetry data from cache 314 and send the telemetry data to subscribing applications 301, 402.

The above described techniques for state transition are described in the context of an application registration request. Other state transition techniques may be used in other scenarios. Examples of such scenarios include a previously registered application requesting a new protocol, unregistering from a previously requested protocol, a new application requesting telemetry for a device already registered for telemetry collection by a different application. In some aspects, such cases may be handled by telemetry controller 221, and more particularly, may be handled by API server 406 of telemetry controller 221. As noted above, API server 406 may be an entry point to telemetry controller 221 with respect to application requests. API server 406 can determine if a current registration related request (e.g., registration or un-registration) would result in changes to the list of sensors requested for a protocol. If a change is to be made. API server 406 may modify the protocol state for a device as follows:

If the current protocol state is one of ConfigSent 608 or ConfigSuccess 610, the state transitions to Ready 606.
If the current protocol state is either Incomplete 602 or Pending 604, the new state will be Incomplete 602.
If the current protocol state is Ready 606, it remains Ready 606.

Any subsequent operations of telemetry controller 221 and its components API server 406, device configuration generator 410, and inventory worker 408 will occur as described above depending on the new state.

In some aspects, the above described state machine can facilitate accurate functioning of the control plane of a network system and may facilitate effective determination of an operation that the Controller is currently executing. As a result, the state machine can be used to identify failures or errors in the network system should they occur. Techniques for use of the state machine in error or failure detection will be described in further detail below.

Figure 7:
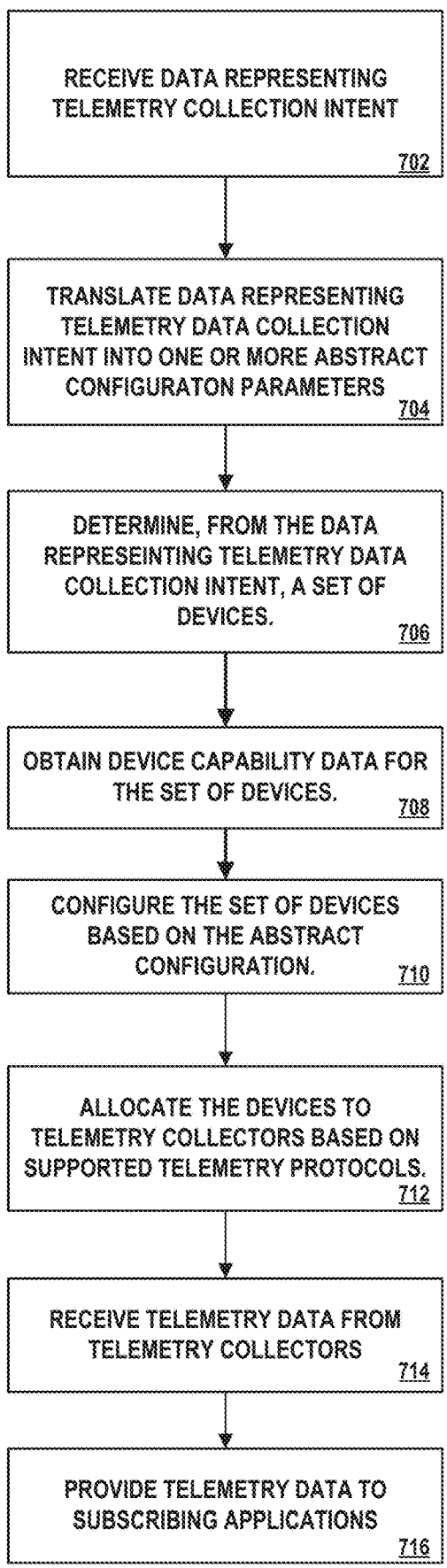
FIG. 7 is a flow diagram illustrating operations performed by an example telemetry collection service in accordance with one or more aspects of the present disclosure.

FIG. 7 is a flow diagram illustrating operations performed by an example telemetry collection service in accordance with one or more aspects of the present disclosure. FIG. 7 is described herein within the context of telemetry service 140 of FIGS. 1, 2, 3A, 3B and 4. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described. The techniques described in FIG. 7 may be used to facilitate a telemetry service that is easy to utilize and is scalable.

An application, such as an EMS application 402 (FIG. 4), may provide data representing telemetry data collection intent to a telemetry controller 221 (702). As described above, a telemetry data collection intent may be a high level description of requirements for collecting telemetry data from devices in a network system. A telemetry intent compiler can translate the telemetry data collection intent into abstract telemetry configuration parameters that include parameters that define the telemetry data to be collected (704). Additionally, the telemetry controller can determine, based on the telemetry data collection intent, a set of devices in the network system that telemetry data is to be collected from (706).

Telemetry controller 221 can obtain device capability information for each device in the set of devices from a device management service 310 (708). The device capability information can include a telemetry protocol supported by the device.

Telemetry controller 221 can configure each device based on the abstract telemetry configuration parameters and the telemetry protocol supported by the device (710). For example, the telemetry controller can create a protocol specific telemetry configuration for the device and push the configuration to the device.

Telemetry controller 221 can allocate the device to an instance of a plurality of telemetry collectors based on the supported telemetry protocol of the device (712). In some aspects, telemetry collectors are configured to support a particular telemetry protocol. Further, there may be multiple instances of a telemetry collector that supports the particular telemetry protocol. Telemetry controller 221 may allocate the device to an instance of the telemetry collector configured for the telemetry protocol supported by the device.

Telemetry collectors can obtain telemetry data from their respective allocated devices and place the collected telemetry data into a cache (714). The telemetry data may be normalized as described above prior to placement in the cache. Applications may subscribe to the telemetry data and receive the telemetry data after it has been placed in the cache (716).

Figure 8:
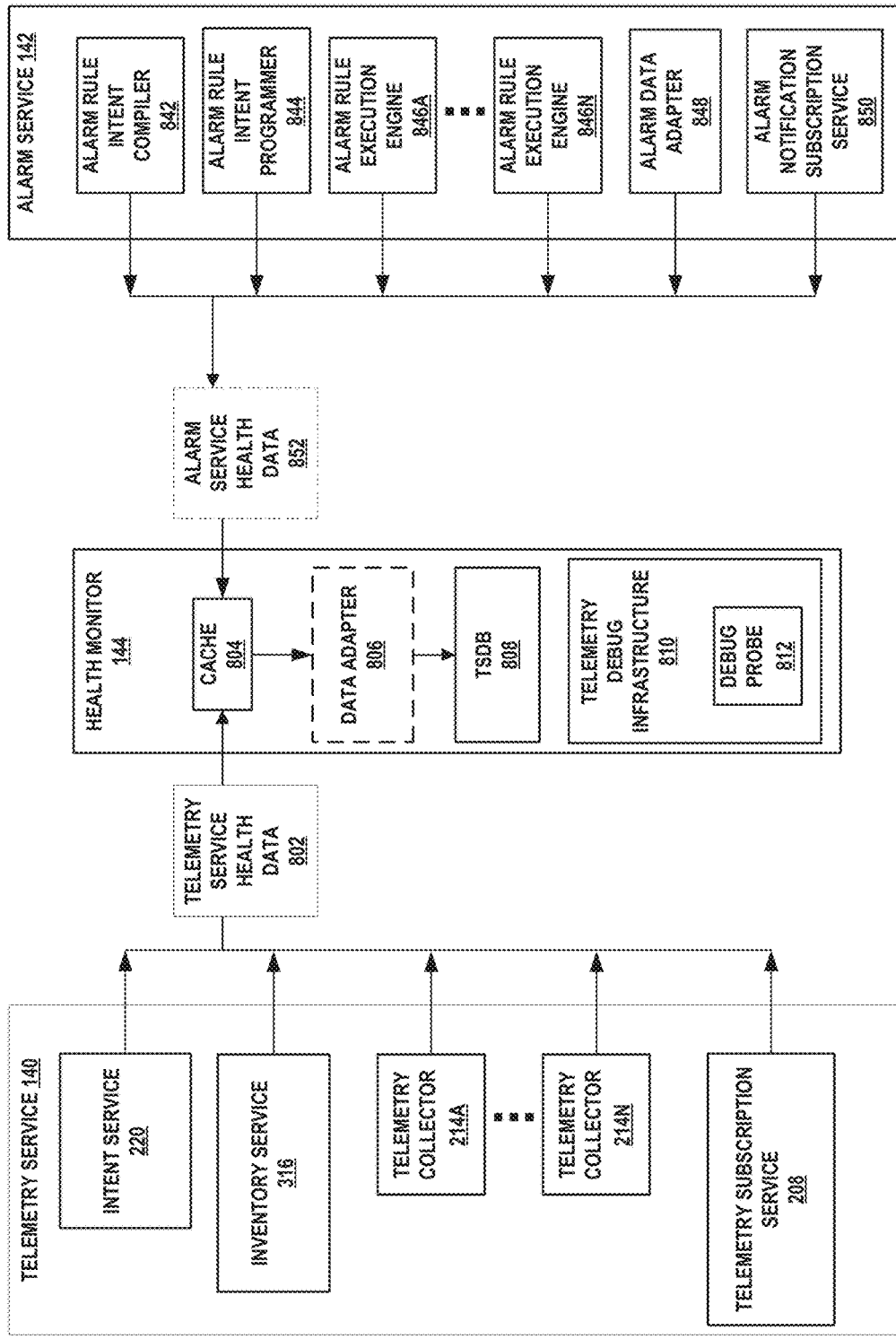
FIG. 8 is a block diagram illustrating a health monitoring system for a telemetry collection service according to one or more aspects of the disclosure.

FIG. 8 is a block diagram illustrating a health monitoring system 800 for a telemetry service according to one or more aspects of the disclosure. Health monitoring system 800 can monitor the health of a network system and can both process data that can be used to determine when new instances of components need to be added to meet current loads on the system as well as locate errors or erroneous operation of the system.

As discussed above, telemetry service 140 can include multiple services that operate in a control plane and a data plane of a network system. Similarly alarm service 142 may include multiple services that make use of the telemetry data to provide alarms when telemetry data indicates an anomaly. During telemetry data collection, different services in the control plane and data plane may need to be provisioned for the collection of telemetry data from infrastructure components such as devices and applications. However, in a distributed system such as telemetry service 140 and alarm service 142, failure of different components can exhibit a pathological behavior. Further, both telemetry service 140 and alarm service 142 may be scaled up by adding more instances of services as needed. In a large scale distributed system employing horizontally scaled collectors and fault tolerant controllers and subscription services which are managing potential thousands of devices, it can be difficult to find a component which caused an error at a given time. For example, provisioning a device may not have gone well at a particular time because of a transient network issue. In such a case, it can be very difficult to find the component at fault because of the sheer size of the system. Generally, logging errors can help, but too many noisy logs of configurations will overlap with this error making the error the equivalent of a needle in a haystack problem. Thus, it can be challenging to troubleshoot and localize an error to a specific component.

In some aspects, a health monitoring system 800 includes a health monitor 144 that is configured to monitor a telemetry service 140 and optionally, an alarm service 142. In some aspects, health monitor 144 includes cache 804, data adapter 806, time series data base (TSDB) 808, and optionally, telemetry debug infrastructure 810 and debug probe 812.

Health monitor 144 can receive streams of telemetry service health data 802 and, optionally, alarm service health data 852. In some aspects, telemetry service health data 802 and alarm service health data 852 include metrics from various components of telemetry service 140 and alarm service 142. Telemetry service health data 802 and alarm service health data 852 may include both metrics that are common across the different components providing health data and metrics that may be unique to a particular service or component.

Alarm service health data may be generated by alarm service can be from any of multiple components of alarm service 142. Examples of such components include alarm rule intent compiler 841, alarm rule intent programmer 844, alarm rule execution engines 846A-N (collectively alarm rule execution engines 846), alarm data adapter 848 and alarm notification subscription service 850.

Alarm rule intent compiler 841 receives an alarm intent 230 that expresses, at a high level, an intent for alarm generation and translates the alarm intent into one or more lower level alarm rules that implement the alarm intent 230. The alarm intent 230 may be in a natural language. As an example, an alarm intent 230 may be "Notify if CPU and Network Usage deviates from normal behavior in a cluster."

Alarm rule intent programmer 844 receives alarm rules and determines one or more alarm rule execution engines 846 that are to process the alarm rules. Alarm rule intent instance 844 may program mutually exclusive subsets of alarm rules to alarm rule execution engines 846.

Alarm rule execution engines 846A-N(collectively alarm rule execution engines 846) receive telemetry data from devices on network system 205 via telemetry service 140. Alarm rule execution engines 846 apply the rules for which they have been programmed to the telemetry data and, if the rule is satisfied, generate the corresponding alarm for the rule.

Alarm data adapter 848 can persist alarm notifications into a persistent storage. It is possible that the same metric data can be collected by different telemetry protocols such as Simple Network Management Protocol (SNMP), Google Remote Procedure Calls (gRPC), Junos Telemetry Interface (JTI) etc. However, when an alarm notification is generated, alarm data adapter 848 can translate output results into a consistent normalized representation for use by applications.

Alarm notification subscription service 850 provides an interface for applications to notify the alarm service 142 that the application wishes to receive notifications of alarms. The application can specify the alarms or type of alarms for which the application is interested in receiving notifications. In some aspects, there may be multiple end-user applications, management applications, and services that are interested in receiving real-time and historical alarm notifications.

Further details on the above described components of alarm service 142 and other components of alarm service not shown in FIG. 8 may be found in co-filed, co-pending U.S. patent application Ser. No. 16/947,927, entitled "INTENT-BASED DISTRIBUTED ALARM SERVICE", which has been previously incorporated by reference.

Cache 804 may receive the telemetry service health data 802 and alarm service health data 852. Data adapter 806 can read incoming telemetry service health data 802 and alarm service health data 852. In some cases, metrics provided by different components of telemetry service 140 and/or alarm service 142 may be the same, but may have different labels or value formats. Data adapter 806 can convert the metrics in the health data into a uniform format with uniform labels. Data adapter 806 can store the converted metrics in TSDB 808.

Health monitor 144 can periodically evaluate the metrics in TSDB 808 at a predetermined or configurable interval. For example, health monitor 144 can evaluate the metrics to determine load conditions and counts of repeated errors. FIGS. 14A and 14B illustrate examples of metrics that may be collected from components of telemetry service 140. FIG. 15 illustrates examples of metrics that may be collected from components of alarm service 142.

In some aspects, in addition to storing health data in TSDB 808, health monitor 144 may generate error codes that can be stored in TSDB 808. In some aspects, health monitor 144 may generate error codes based on transitions between states of state machine 600 described above with reference to FIG. 6. For example, health monitor 144 may detect a failure in a transition from one state to another and generate an error code indicating the failure.

As discussed above, telemetry controller 221 communicates with inventory service 316 to obtain device specific information and capabilities. A list of example error codes that may be generated during failure conditions for state machine 600 related to telemetry controller 221's interactions with inventory service 316 is as follows:

Connection to DMS Fails—Channel not in Ready State—INVCXNERR
Get Device Capabilities RPC Exception—INVGDCEXP
Get Device Capabilities RPC Error—INVGDCERR
Validation fails while parsing device definition—INVVALERR A list of example error codes that may be generated during failure conditions for state machine 600 related to device configuration generator 410 is as follows:

Connection to DMS Fails—Channel not in Ready State—DCCXNERR
Get Template MID RPC Fails Error—DCTUIERR
Get Template UUID RPC Fails Exception—DCTUIEXP
Get Template RPC Fails Error—DCTEMERR
Get Template RPC Fails Exception—DCTEMEXP
Render Template RPC Error—DCRETERR
Push Config RPC Error—DCPCOERR
Push Config RPC Exception—DCPCOEXP
DMS failed to configure protocol—DCCONERR For a given telemetry request, a specific error code such as one from the examples noted above may be sufficient to identify a specific service for which error is seen thus facilitating troubleshooting and recovery from the error. Telemetry service 144 can provide an RPC that can relay the above described error messages and current status codes on a client's request. Such an RPC can keep a telemetry service 140 client informed of any connection or network issues.

Some errors in a network system can be transient and some errors in the system can be persistent. In some aspects, in order to identify persistent issues in a network system, health monitor 144 may perform clustering analysis on the error codes generated by the system. Health monitor 144 may include tracing tools (not shown) that may scan over the error codes that are generated to determine a service (e.g., a microservice) that is experiencing persistent issues.

In some aspects, health monitor 144 periodically performs clustering analysis algorithms on sets of error codes generated by different services within a monitoring time window. Each error code may include data that identifies the source service instance and telemetry state in which error was observed. In some aspects, a K-means clustering algorithm may be employed to determine a state and frequency of the errors that are observed. An example of output of clustering analysis that shows a state and corresponding error frequencies is as follows:

TABLE 1

| Telemetry State | Error Code Frequency |
| --- | --- |
| INCOMPLETE | INVCXNERR: 5 |
| CONFIG_SENT | DCCXNERR: 3 |
|  | DCTUIERR: 6 |
| PENDING | INVGDCERR: 2 |

Once health monitor determines per state errors frequency, health monitor 144 may determine a root cause for these error conditions. It is possible that problems in one service can be a cause for these error conditions. Further, it is possible that problems in a service can cause failure in the multiple dependent services. This situation can be treated as a maximum coverage problem for fault localization as described in Kompella, R. R., Yates, J., Greenberg, A., and Snoren, A. C., Detection and Localization of Network Black Holes, *Proc. IEEE INFOCOM* (2007), which is hereby incorporated by reference. In solving a maximum coverage problem, observations can be mapped to likely causes. In some aspects, health monitor 144 can treat error codes as observations and likely causes as the set of services that could be the root cause of the failure. In applying maximum coverage solution techniques to fault location in a telemetry service 140 or alarm service 140, a goal can be to find a minimal set of likely causes of a fault that can explain all of the observations.

Figure 9:
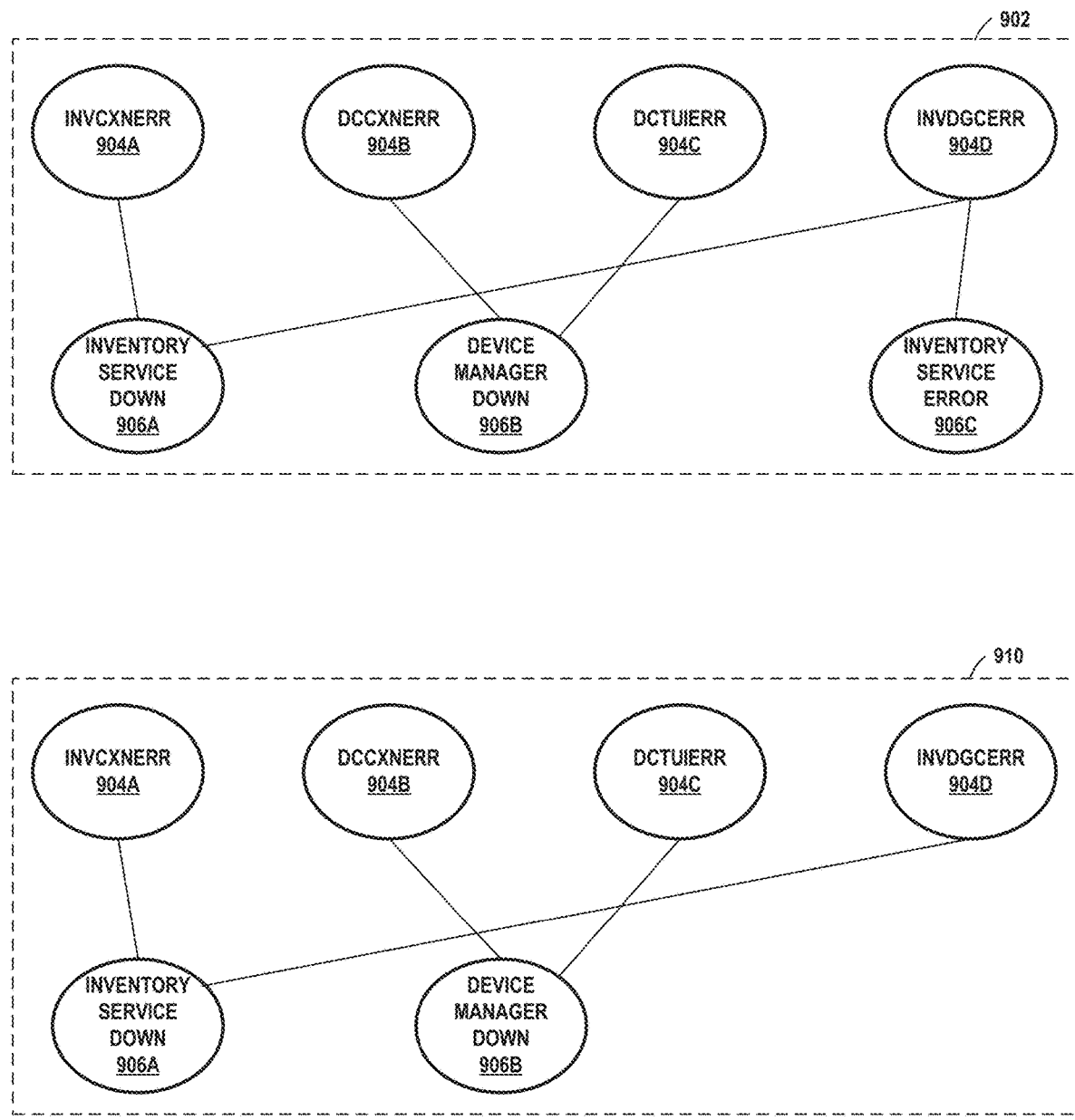
FIG. 9 is a conceptual diagram illustrating clustering of error codes for fault localization in a health monitoring system according to one or more aspects of the present disclosure.

FIG. 9 is a conceptual diagram that illustrates examples of clustering of error codes for fault localization. Graph 902 shows observations that comprise error codes that have been observed and the services in which the error code occurs from the example data provided in Table 1 above. In graph 902, error codes 904A-D are mapped to services 906A-C that generated (e.g., observed) the error codes. Services 906A-C are the set of services that could be the root cause of a failure. In solving the maximum coverage problem in this example, the goal is to find a minimal set of likely causes from the set of services 906A-C that can explain all of the observed error codes 904A-D. Health monitor 144 can apply a "greedy" algorithm to the data shown in graph 902 to determine the smallest likely cause set of services that can explain the observed error codes 904A-D. Graph 910 shows the result of the application of the greedy algorithm. As can be seen in graph 910, error codes 904A-D can be mapped to services 906A and 906B, service 906D has been pruned from the graph. Thus, error codes 904A-D in the example can be attributed to a problem with two services, inventory service 316 and device manager service 310. Graphs 902 and 910 illustrate an example with relatively few error codes and services in order to more easily illustrate the techniques. A running system will typically have many more error codes and services as nodes in the graph. The automated pruning of services illustrated in the example graphs 902 and 910 can result in faster and more efficient trouble shooting of errors in a network system.

Returning to FIG. 8, in some aspects, health monitor 144 can generate a debug probe 812 that can be used for error localization in a telemetry service 140 or alarm service 142. Debug probe 812 may be used to validate a telemetry control plane. For example, debug probe 812 can be generated by health monitor 144 to execute a path across multiple services involved with telemetry provisioning. Debug probe 812 can test the end-to-end path from device discovery and onboarding to eventual telemetry data collection. If a failure is observed during the execution of debug probe 812, the error code for the error and the specific service where the error was observed can be output (e.g., stored in TSDB 808).

Debug probe 812 can be part of a telemetry debug infrastructure 810 that may be useful in checking the current status of a telemetry request accepted by API server 406. For example, telemetry debug infrastructure 810 may be able to locate where a telemetry request is "stuck" in the system. Telemetry debug infrastructure 810 may use state machine 600 (FIG. 6) to make such a determination. In some aspects, a telemetry request may include an application-device combination for which telemetry service 140 is to collect telemetry data. Telemetry debug infrastructure 810 may include both validation mechanisms and a scaled down environment to check the correctness of collection code against known configurations.

Figure 10:
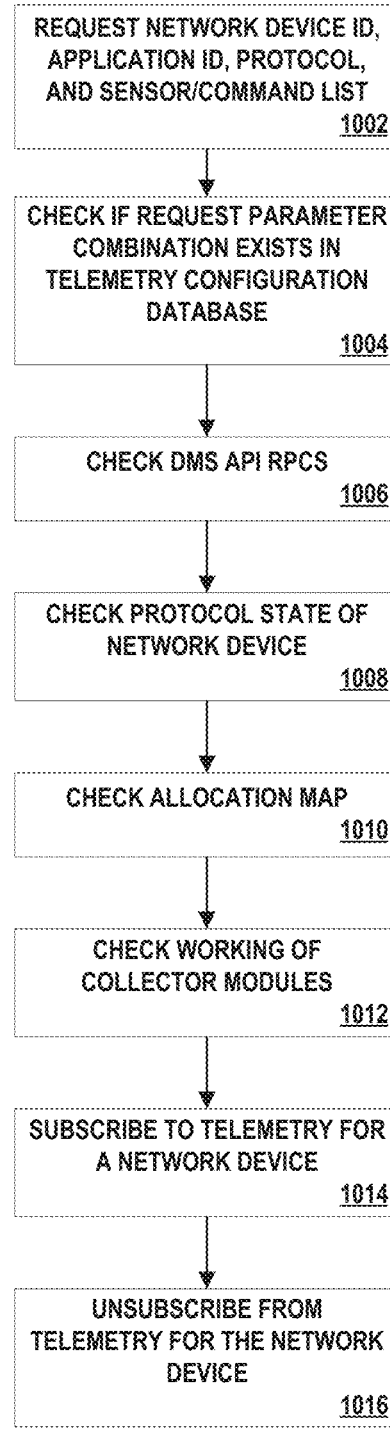
FIG. 10 is a flow diagram illustrating operations for localizing errors using debug probe generation for a telemetry collection service according to one or more aspects of the present disclosure.

FIG. 10 is a flow diagram illustrating operations for localizing errors using debug probe generation for a telemetry collection service according to one or more aspects of the present disclosure. For the purpose of describing such operation, it will be assumed that a request has been issued with respect to an application-device combination and that the request is "stuck" (e.g., the request is not completely processed by telemetry service 140). The request will typically be received at API server 406 (1002). The request may include parameters such as a device identifier, an application identifier, a protocol, and a list of one or more sensors or commands that are the subject of the request.

Debug probe 812 can determine if the request has been accepted by API server 406 (1004). For example, debug probe 812 can scan telemetry configuration database 404 to check for an entry in the database that corresponds to the request parameters.

Debug probe 812 can perform a check of the APIs of DMS 310 (1006). In some aspects, debug probe 812 may make API calls via gRPC using certificate credentials and a token that specify pre-defined capabilities. The certificate credentials and token can indicate that the debug probe 812 is authorized to call the specific set of APIs in the DMS 310 to validate the APIs are working. In some aspects, debug probe 812 may check a "get device capabilities" call, a "get template" call, and a "push configuration" call. With respect to the push configuration call, DMS 310 may check to make sure that the configuration that is pushed to the device does not conflict with a configuration that has been previously pushed to the device.

Debug probe 812 can check the current state of the protocol of the device (1008). If the protocol request state is NotPresent 612, debug probe 812 can indicate that there is an error or issue in instance of API server 406. If the protocol state is Incomplete 602 or Pending 604, debug probe 812 an indicate that there is an issue or error with an instance of device configuration generator 410. Further, if the protocol state is Ready 606 or ConfigSent 608 for an instance of gRPC collector 214F, SNMP trap collector 214A or JTI collector 214B, debug probe 812 can indicate that there is an error or issue with an instance of device configuration generator 410.

Debug probe 812 can check an allocation map (1010). As noted above, collector allocator 412 may allocate devices and protocols to instances of telemetry collectors 214 and may track the allocation with an allocation map. For example, in some instances, for devices supporting SNMP, gRPC and/or NETCONF, devices may be allocated to collect Kubernetes pods by collector allocator 412. Debug probe 812 can verify that each device that needs to be monitored using gRPC, SNMP or NETCONF collectors has a corresponding entry in the allocation map table which is persisted in telemetry configuration database 404. In some aspects, debug probe 812 can check the database entry for a device to pod mapping, and if not found can raise an error.

Debug probe 812 can check the working of telemetry collectors 214 (1012). For example, debug probe 812 can verify that the specific Kubernetes pod that is responsible for monitoring a specific device 320 is able to reach the device and open a connection with the device for polling use cases.

Debug probe 812 can subscribe to telemetry data for a device (1014). For example, debug probe 812 can send a test subscription request to telemetry subscription service 208. Debug probe 812 can verify at the test subscription was created, and that desired telemetry is received.

Debug probe 812 can unsubscribe to telemetry data for the device (1016). Debug probe 812 can verify that the unsubscribe request for the test subscription was processed properly and that telemetry data is no longer received.

Figure 11:
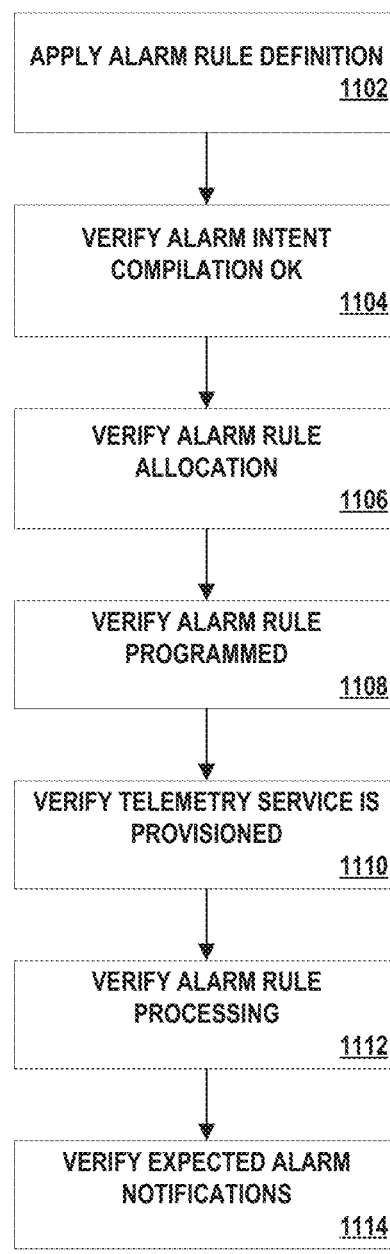
FIG. 11 is a flow diagram illustrating operations for localizing errors using debug probe generation for an alarm service according to one or more aspects of the present disclosure.

FIG. 11 is a flow diagram illustrating operations for localizing errors using debug probe generation for an alarm service according to one or more aspects of the present disclosure. In some aspects, debug probe 812 may generate an alarm rule and verify the end-to-end path of the alarm.

Debug probe 812 may apply a test alarm rule definition by submitting a test alarm rule intent to alarm service 144 (1102). The test alarm rule intent may be data representing a high-level expression of an intent with respect to a test alarm rule. As an example, the test alarm rule intent may be "Notify if Network Usage is above 1 MB/s in a cluster." Alarm rule intent compiler 842 may translate the high-level expression of intent into one or more lower alarm rules. In this example, alarm rule intent compiler 842 may automatically generate, from the test alarm rule intent, two alarm rules:

1. if/network/ingress/bit_rate is above 1 MB/s for N' out of M' monitoring windows then raise alarm for all devices in the systems
2. If/network/egress/bit_rate is above 1 MB/s for N' out of M' monitoring windows then raise alarm for all devices in the systems Debug probe 812 may verify that the test alarm rule intent was compiled properly by alarm rule intent compiler 842 (1104). For example, debug probe 812 may compare known alarm rules that should be generated from a known test alarm rule intent.

After a test alarm rule intent has been compiled, the generated alarm rules may be allocated to one or more instances of an alarm rule execution engine. Debug probe 812 may verify that the alarm rules generated by alarm rule intent compiler 842 were allocated to an instance of an alarm rule execution engine (1106). Additionally, after a test alarm rule intent has been compiled into alarm rules, alarm rule intent programmer 844 programs the rules into one or more alarm rule execution engines 846. Debug probe 812 can verify that the alarm rules have in fact been programmed into at least one alarm rule execution engine (1108).

Alarm rule execution engines 846 subscribe to telemetry data based on data and device specified by an alarm rule. Debug probe 812 can verify that telemetry service 142 components have been provisioned and that an alarm rule execution engine has subscribed to telemetry data as specified by the generated alarm rules (1110).

Debug probe 812 can verify alarm rule processing (1112). For example, debug probe 812 can generate the conditions that should be sufficient to trigger the alarm. For the example test alarm rule intent, debug probe 812 may generate sufficient network traffic to trigger the alarm. Debug probe 812 can verify that it receives expected alarm notifications (1114) as specified by the telemetry alarm rule intent.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIGS. 1, 2, 3A, 3B and/or 4) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Further, one or more modules or components may, interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Also, one or more devices or components that may be illustrated in various Figures herein may alternatively be implemented as part of another device or component not shown in such Figures. In this and other ways, some of the functions described herein may be performed via distributed processing by two or more devices or components.

Each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method for providing a telemetry service in a virtualized computing infrastructure, the method comprising:
receiving, by a telemetry controller executed by one or more processors, and from an application, data representing a telemetry data collection intent;
obtaining, by the telemetry controller, one or more abstract telemetry configuration parameters determined by translating the data representing the telemetry data collection intent, the abstract telemetry configuration parameters comprising a device independent specification of parameters and desired telemetry data;
determining, by the telemetry controller and from the data representing the telemetry data collection intent, a set of devices of the virtualized computing infrastructure;
obtaining, by the telemetry controller and from a device management service executed by the one or more processors, device capability information for the set of devices, the device capability information including, for each device of the set of devices, a supported telemetry protocol; and
for each device of the set of devices:
translating, by the device management service, the device independent specification of the abstract telemetry configuration parameters to device dependent configuration parameters for the device,
configuring, by the device management service, the device based on the device dependent configuration parameters, and
allocating, by the telemetry controller and based on the supported telemetry protocol of the device, the device to an instance of a plurality of virtualized telemetry collectors to process telemetry data for the supported telemetry protocol of the device.

2. The method of claim 1, wherein configuring the device based on the device dependent configuration parameters comprises:
determining a platform dependent telemetry configuration based on the abstract telemetry configuration parameters and the supported telemetry protocol of the device; and
providing the platform dependent telemetry configuration to the device.

3. The method of claim 1, further comprising:
receiving, from the application, a request to subscribe to telemetry data for a selected device of the set of devices;
retrieving, from a database, telemetry data for the selected device; and
providing the telemetry data to the application.

4. The method of claim 3, further comprising:
normalizing a label for a data element of the telemetry data and normalizing a value of the data element; and
storing, in the database, the normalized value of the data element in association with the normalized label;
wherein retrieving, from the database, the telemetry data for the selected device comprises retrieving the normalized value of the data element.

5. The method of claim 1, wherein allocating the device to the instance of the plurality of virtualized telemetry collectors comprises allocating the device based on a resource us age associated with the instance of the plurality of virtualized telemetry collectors.

6. The method of claim 1, wherein the instance of the plurality of virtualized telemetry collectors is a first instance of the plurality of virtualized telemetry collectors, and the method further comprising:
in response to determining that a resource utilization by the first instance of the plurality of virtualized telemetry collectors exceeds a threshold, reallocating one or more devices allocated to the first instance of the plurality of virtualized telemetry collectors that exceeded the threshold to a second instance of the plurality of virtualized telemetry collectors.

7. The method of claim 1, wherein the instance of the plurality of virtualized telemetry collectors is a first instance of the plurality of virtualized telemetry collectors, and the method further comprising:
in response to determining that the first instance of the plurality of virtualized telemetry collectors has failed, reallocating one or more devices allocated to the first instance of the plurality of virtualized telemetry collectors that failed to a second instance of the plurality of virtualized telemetry collectors.

8. The method of claim 1, further comprising: maintaining, for each device of the set of devices, a state machine for each supported telemetry protocol of the device, the state machine having a plurality of states, wherein a state of the plurality of states indicates a status of a component of the telemetry service with respect to a request received by the telemetry service to collect telemetry data for the device using the supported telemetry protocol.

9. The method of claim 8, further comprising generating an error code based on the state of the plurality of states.

10. The method of claim 8, wherein the state machine for each device of the set of devices is included in a plurality of state machines, and wherein the method further comprises:
receiving a plurality of error codes, the error codes generated based on one or more states of the plurality of state machines;
creating a plurality of clusters of the plurality of error codes; and
determining one or more fault locations based on the clusters of the plurality of error codes.

11. The method of claim 1, where the data comprises first data and wherein the telemetry data collection intent comprises first telemetry data collection intent, the method further comprising:
receiving second data representing second telemetry data collection intent; and
combining the first data representing the first telemetry data collection intent with the second data representing the second telemetry data collection intent to create a union of telemetry data collection intent.

12. A telemetry service system comprising processing circuitry having access to a storage device, the processing circuitry configured to:
receive, by a telemetry controller executed by the processing circuitry, and from an application, data representing a telemetry data collection intent;
obtain, by the telemetry controller, one or more abstract telemetry configuration parameters determined by translating the data representing the telemetry data collection intent, the abstract telemetry configuration parameters comprising a device independent specification of parameters and desired telemetry data;
determine, by the telemetry controller and from the data representing the telemetry data collection intent, a set of devices of a plurality of devices;
obtain, by the telemetry controller and from a device management service executed by the processing circuitry, device capability information for each of the set of devices, the device capability information including, for each device of the set of devices, a supported telemetry protocol; and
for each device of the set of devices:
translate, by the device management service, the device independent specification of the abstract telemetry configuration parameters to device dependent configuration parameters for the device,
configure, by the device management service, the device based on the device dependent configuration parameters, and
allocate, by the telemetry controller and based on the supported telemetry protocol of the device, the device to an instance of a plurality of virtualized telemetry collectors to process telemetry data for the supported telemetry protocol of the device.

13. The telemetry service system of claim 12, wherein to configure the device based on the device dependent configuration parameters, the processing circuitry is configured to:
determine a platform dependent telemetry configuration based on the abstract telemetry configuration parameters and the supported telemetry protocol of the device; and
provide the platform dependent telemetry configuration to the device.

14. The telemetry service system of claim 12, wherein the processing circuitry is further configured to:
receive, by a telemetry subscription service executed by the processing circuitry and from the application, a request to subscribe to telemetry data for a selected device of the set of devices;
retrieve, by the telemetry subscription service and from a database, telemetry data for the selected device; and
provide, by the telemetry subscription service, the telemetry data to the application.

15. The telemetry service system of claim 14, wherein the processing circuitry is further configured to:
normalize a label for a data element of the telemetry data and normalize a value of the data element, wherein the normalized label for the data element is consistent across the plurality of virtualized telemetry collectors; and
store, in the database, the normalized value of the data element in association with the normalized label,
wherein to retrieve the telemetry data for the selected device, the telemetry subscription service is configured to retrieve the normalized value of the data element.

16. The telemetry service system of claim 12, wherein the processing circuitry is further configured to allocate the device to the instance of the plurality of virtualized telemetry collectors based on a resource usage associated with the instance of the plurality of virtualized telemetry collectors.

17. The telemetry service system of claim 12, wherein the instance of the plurality of virtualized telemetry collectors is a first instance of the plurality of virtualized telemetry collectors, and wherein the processing circuitry is further configured to:
in response to a determination that a resource utilization by the first instance of the plurality of virtualized telemetry collectors exceeds a threshold, reallocate one or more devices allocated to the first instance of the plurality of virtualized telemetry collectors that exceeded the threshold to a second instance of the plurality of virtualized telemetry collectors.

18. The telemetry service system of claim 12, wherein the processing circuitry is further configured to maintain, for each device of the set of devices, a state machine for each supported telemetry protocol of the device, the state machine having a plurality of states, wherein a state of the plurality of states indicates a status of a component of the telemetry service with respect to a request received by the telemetry service to collect telemetry data for the device using the supported telemetry protocol.

19. The telemetry service system of claim 18, wherein the state machine for each device of the set of devices is included in a plurality of state machines, and wherein the processing circuitry is further configured to:
receive, by a health monitor executed by the processing circuitry, a plurality of error codes, the error codes generated based on one or more states of the plurality of state machines;

create a plurality of clusters of the plurality of error codes; and determining one or more fault locations based on the clusters of the plurality of error codes.

20. A non-transitory computer-readable storage medium comprising instructions that, when executed, cause processing circuitry of a virtualized computing infrastructure to:

receive, by a telemetry controller executed by the processing circuitry, and from an application, data representing a telemetry data collection intent;

obtain, by the telemetry controller, one or more abstract telemetry configuration parameters determined by translating the data representing the telemetry data collection intent, the abstract telemetry configuration parameters comprising a device independent specification of parameters and desired telemetry data;

determine, by the telemetry controller and from the data representing the telemetry data collection intent, a set of devices of the virtualized computing infrastructure;

obtain, by the telemetry controller and from a device management service executed by the processing circuitry, device capability information for the set of devices, the device capability information including, for each device of the set of devices, a supported telemetry protocol; and for each device of the set of devices:

translate, by the device management service, the device independent specification of the abstract telemetry configuration parameters to device dependent configuration parameters for the device, and configure, by the device management service, the device based on the device dependent configuration parameters, and allocate, by the telemetry controller and based on the supported telemetry protocol of the device, the device to an instance of a plurality of virtualized telemetry collectors configured to process telemetry data for the supported telemetry protocol of the device.

* * * * *